(12) United States Patent
Ito

(10) Patent No.: US 11,145,883 B2
(45) Date of Patent: Oct. 12, 2021

(54) FUEL CELL SYSTEM

(71) Applicant: TOYOTA JIDOSHA KABUSHIKI KAISHA, Toyota (JP)

(72) Inventor: Masayuki Ito, Sunto-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 150 days.

(21) Appl. No.: 16/543,014

(22) Filed: Aug. 16, 2019

(65) Prior Publication Data

US 2020/0067119 A1    Feb. 27, 2020

(30) Foreign Application Priority Data

Aug. 24, 2018    (JP) .............................. JP2018-157672

(51) Int. Cl.
    *H01M 8/04*       (2016.01)
    *H01M 8/04858*    (2016.01)
    *H01M 8/04664*    (2016.01)

(52) U.S. Cl.
    CPC ... *H01M 8/04932* (2013.01); *H01M 8/04671* (2013.01); *H01M 8/04873* (2013.01); *H01M 2250/20* (2013.01)

(58) Field of Classification Search
    CPC .................... H01M 8/04873; H01M 8/004932
    See application file for complete search history.

(56) References Cited

U.S. PATENT DOCUMENTS

| | | | | |
|---|---|---|---|---|
| 2006/0257696 A1* | 11/2006 | Sridhar | ............. | H01M 8/04753 429/430 |
| 2009/0088915 A1* | 4/2009 | Kizaki | .................... | B60L 50/51 701/22 |
| 2010/0009220 A1* | 1/2010 | Higdon | ............... | H01M 8/0494 429/431 |
| 2011/0003221 A1* | 1/2011 | Mizuno | ............... | H01M 8/0488 429/429 |
| 2012/0040265 A1 | 2/2012 | Kamijo et al. | | |
| 2013/0084510 A1* | 4/2013 | Masui | ............... | H01M 8/04395 429/423 |

(Continued)

FOREIGN PATENT DOCUMENTS

| | | |
|---|---|---|
| JP | 2001-143735 | 5/2001 |
| JP | 2003-178786 | 6/2003 |

(Continued)

*Primary Examiner* — Amanda C. Walke
(74) *Attorney, Agent, or Firm* — Finnegan, Henderson, Farabow, Garrett & Dunner, LLP

(57) ABSTRACT

A fuel cell system includes: a first fuel cell; a second fuel cell having a greater maximum power output than the first fuel cell; and a controller configured to cause the first fuel cell to generate greater electric power greater than the second fuel cell when the requested power is smaller than a first threshold, cause the second fuel cell to generate greater electric power than the first fuel cell when the requested power is a second threshold, which is the first threshold or greater and smaller than a third threshold that is greater than the second threshold, is 70% of the maximum power output of the second fuel cell or grater, and is 100% of the maximum power output of the second fuel cell or smaller, and cause both the first and second fuel cells to generate electric power when the requested power is the third threshold or greater.

10 Claims, 15 Drawing Sheets

(56) References Cited

U.S. PATENT DOCUMENTS

| | | | | |
|---|---|---|---|---|
| 2014/0193732 A1* | 7/2014 | Cavalli | ............ | H01M 8/04798 |
| | | | | 429/431 |
| 2015/0162625 A1* | 6/2015 | Cheatham, III | .. | H01M 8/04619 |
| | | | | 429/430 |
| 2015/0236365 A1 | 8/2015 | Liu et al. | | |
| 2015/0318565 A1* | 11/2015 | Ryu | .................... | H01M 8/0488 |
| | | | | 429/430 |
| 2017/0098840 A1* | 4/2017 | Provost | ............. | H01M 8/04992 |
| 2017/0358809 A1* | 12/2017 | Saito | ................. | H01M 8/04201 |
| 2018/0219238 A1 | 8/2018 | Tanaka et al. | | |
| 2020/0144652 A1* | 5/2020 | Ito | ....................... | H01M 8/0488 |

FOREIGN PATENT DOCUMENTS

| | | |
|---|---|---|
| JP | 2004-178877 | 6/2004 |
| JP | 2006-338967 | 12/2006 |
| JP | 2015-153751 | 8/2015 |
| JP | 2016-072191 | 5/2016 |
| JP | 2016-091625 | 5/2016 |
| WO | WO 2010/134401 | 11/2010 |
| WO | WO 2017/017786 | 2/2017 |

\* cited by examiner

REQUESTED POWER

REQUESTED POWER

FUEL CELL SYSTEM

CROSS-REFERENCE TO RELATED APPLICATION

This application is based upon and claims the benefit of priority of the prior Japanese Patent Application No. 2018-157672, filed on Aug. 24, 2018, the entire contents of which are incorporated herein by reference.

TECHNICAL FIELD

The present disclosure relates to a fuel cell system.

BACKGROUND

Fuel cell systems each including a plurality of fuel cells are known as conventional fuel cell systems. For example, there is a known fuel cell system that includes: first and second fuel cells that differ in power generation efficiency, to generate electric power constantly at high efficiency; and a switch control unit that switches between the first and second fuel cells that supply electric power to a power receiving unit, to maximize power generation efficiency in response to an output request from the power receiving unit as disclosed in, for example, Japanese Patent Laid-Open No. 2016-091625 (hereinafter, referred to as Patent Document 1).

SUMMARY

It is therefore an object of the present disclosure improve durability.

The above object is achieved by a fuel cell system including: a first fuel cell; a second fuel cell having a maximum power output that is greater than a maximum power output of the first fuel cell; and a power generation controller configured to control power generation from the first fuel cell and the second fuel cell in accordance with requested power, wherein, when the requested power is smaller than a first threshold, the power generation controller is configured to cause the first fuel cell to generate electric power greater than electric power of the second fuel cell so that the requested power is supplied, when the requested power is equal to or greater than a second threshold that is equal to or greater than the first threshold, and is smaller than a third threshold that is greater than the second threshold, is equal to or greater than 70% of the maximum power output of the second fuel cell, and is equal to or smaller than 100% of the maximum power output of the second fuel cell, the power generation controller is configured to cause the second fuel cell to generate electric power greater than electric power of the first fuel cell so that the requested power is supplied, and when the requested power is equal to or greater than the third threshold, the power generation controller is configured to cause both the first fuel cell and the second fuel cell to generate electric power so that the requested power is supplied.

In the above configuration, the power generation controller may be configured to suspend power generation from the second fuel cell when the requested power is smaller than the first threshold, and/or may be configured to suspend power generation from the first fuel cell when the requested power is equal to or greater than the second threshold and is smaller than the third threshold.

In the above configuration, the power generation controller may be configured to cause the second fuel cell to generate electric power at a voltage at which elution of a catalyst contained in the second fuel cell is inhibited when the requested power is smaller than the first threshold, and/or may be configured to cause the first fuel cell to generate electric power at a voltage at which elution of a catalyst contained in the first fuel cell is inhibited when the requested power is equal to or greater than the second threshold and is smaller than the third threshold.

In the above configuration, the second threshold may have a greater value than the first threshold, and, when the requested power is equal to or greater than the first threshold and is smaller than the second threshold, the power generation controller may be configured to cause the first fuel cell and the second fuel cell to generate electric power so that the requested power is provided by both the first fuel cell and the second fuel cell.

In the above configuration, when the requested power is equal to or greater than the first threshold and is smaller than the second threshold, the power generation controller may be configured to cause output power of the first fuel cell to become smaller and may be configured to cause output power of the second fuel cell to become larger in response to an increase in the requested power.

In the above configuration, the second threshold may have the same value as the first threshold.

In the above configuration, the first threshold may be equal to or greater than 70% of the maximum power output of the first fuel cell and may be equal to or smaller than 100% of the maximum power output of the first fuel cell.

In the above configuration, when a rate of change in the requested power is equal to or higher than a predetermined value, the power generation controller may be configured to reduce at least one of the first threshold and the third threshold to a smaller value than in a case where the rate of change in the requested power is lower than the predetermined value.

In the above configuration, the fuel cell system may further include a storage unit that is configured to store a map showing a correlation between requested power and an operation time of each of the first fuel cell and the second fuel cell, wherein, on the basis of the map stored in the storage unit, the power generation controller may be configured to change at least one of the first threshold and the third threshold so that the operation time of the second fuel cell becomes equal to or greater than 80% of the operation time of the first fuel cell and equal to or less than 120% of the operation time of the first fuel cell.

In the above configuration, on the basis of a map received from an external server and showing a correlation between requested power and an operation time in another fuel cell system, the power generation controller may be configured to change at least one of the first threshold and the third threshold so that an operation time of the second fuel cell becomes equal to or greater than 80% of an operation time of the first fuel cell and equal to or less than 120% of the operation time of the first fuel cell.

DETAILED DESCRIPTION

The fuel cell system disclosed in Patent Document 1 aims to increase power generation efficiency for requested power, and there is a margin for improvement in increasing durability of the fuel cell system.

The following is a description of embodiments of the present disclosure, with reference to the accompanying drawings.

First Embodiment

Figure 1:
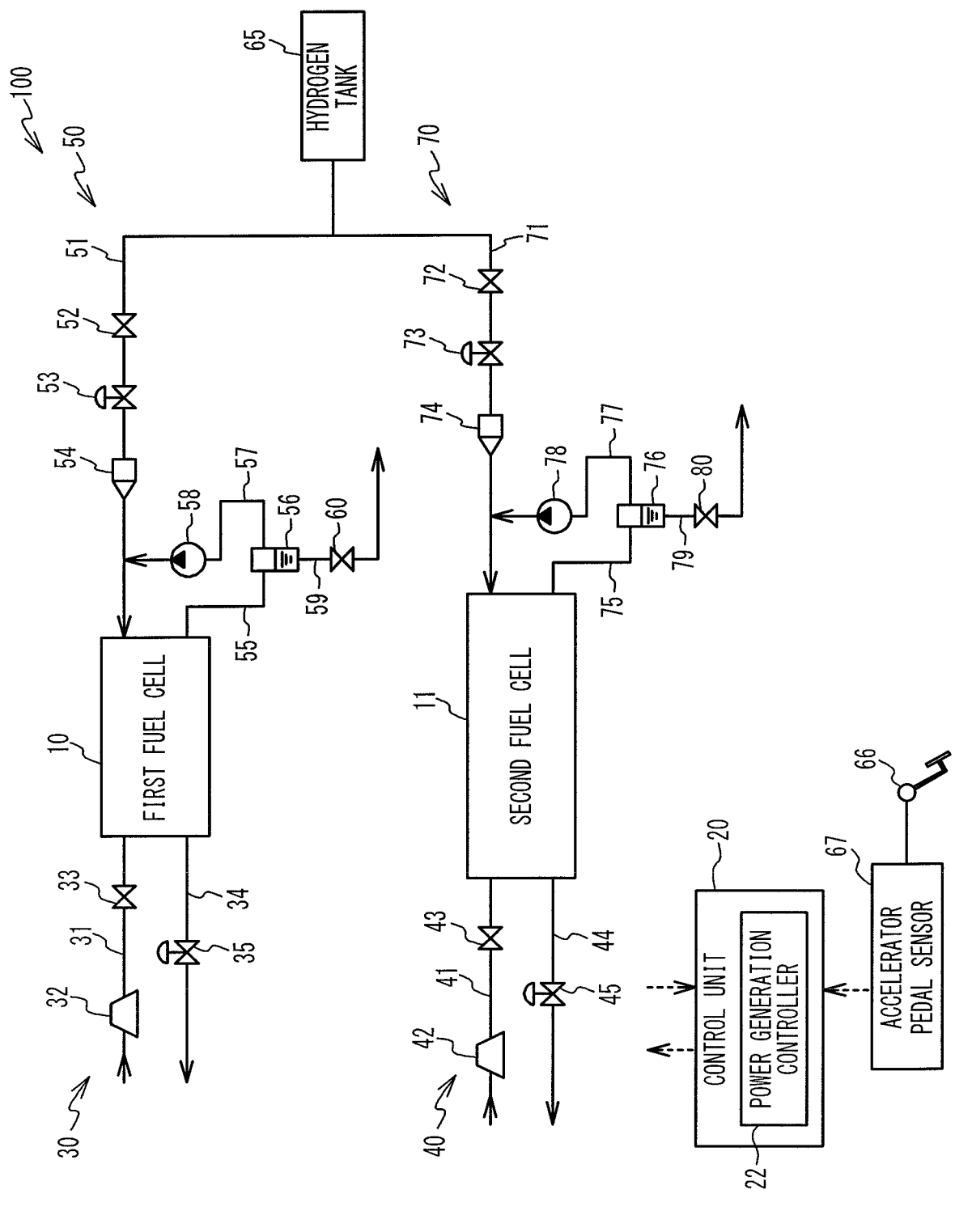
FIG. 1 is a schematic diagram illustrating the configuration of a fuel cell system according to a first embodiment.

FIG. 1 is a schematic diagram illustrating the configuration of a fuel cell system according to a first embodiment. A fuel cell system is a power generating system that is used in a fuel cell vehicle or a stationary fuel cell device or the like, and outputs electric power in accordance with requested power. Note that, in the example cases in the embodiments described below, a fuel cell system is mounted in a vehicle. As illustrated in FIG. 1, a fuel cell system 100 includes a first fuel cell 10, a second fuel cell 11, a control unit 20, cathode gas piping systems 30 and 40, and anode gas piping systems 50 and 70. Note that the fuel cell system 100 also includes a refrigerant piping system, but the refrigerant piping system is neither illustrated nor explained herein.

The first fuel cell 10 and the second fuel cell 11 are solid polymer electrolyte fuel cells that generate electric power upon receipt of a supply of hydrogen (anode gas) and air (cathode gas) as reaction gases. The first fuel cell 10 and the second fuel cell 11 each have a stack structure in which a plurality of cells are stacked. Each of the cells includes a membrane electrode assembly that is a power generating member having electrodes disposed on both sides of an electrolyte membrane, and a pair of separators between which the membrane electrode assembly is interposed.

The electrolyte membrane is a solid polymer membrane formed with a fluorine-based resin material or a hydrocarbon-based resin material containing sulfonate groups, and has excellent protonic conductivity in a wet state. The electrodes contain carbon carriers. The carbon carriers in the electrodes carry the catalyst (platinum, or a platinum-cobalt alloy) for accelerating a power generating reaction. A manifold for supplying the reaction gases is provided in each cell. The reaction gases flowing in the manifolds are supplied to the power generating regions in the respective cells through gas flow channels formed in the respective cells.

The maximum power output of the second fuel cell 11 is higher than that of the first fuel cell 10. For example, the number of stacked cells in the second fuel cell 11 is larger than that in the first fuel cell 10, and accordingly, the second fuel cell 11 has the higher maximum power output. The maximum power output of the second fuel cell 11 may be at least 1.5 times, 1.8 times, or 2.0 times higher than the maximum power output of the first fuel cell 10. The maximum power output of the second fuel cell 11 may be not higher than 3.0 times, 2.8 times, or 2.5 times the maximum power output of the first fuel cell 10.

Figure 2:
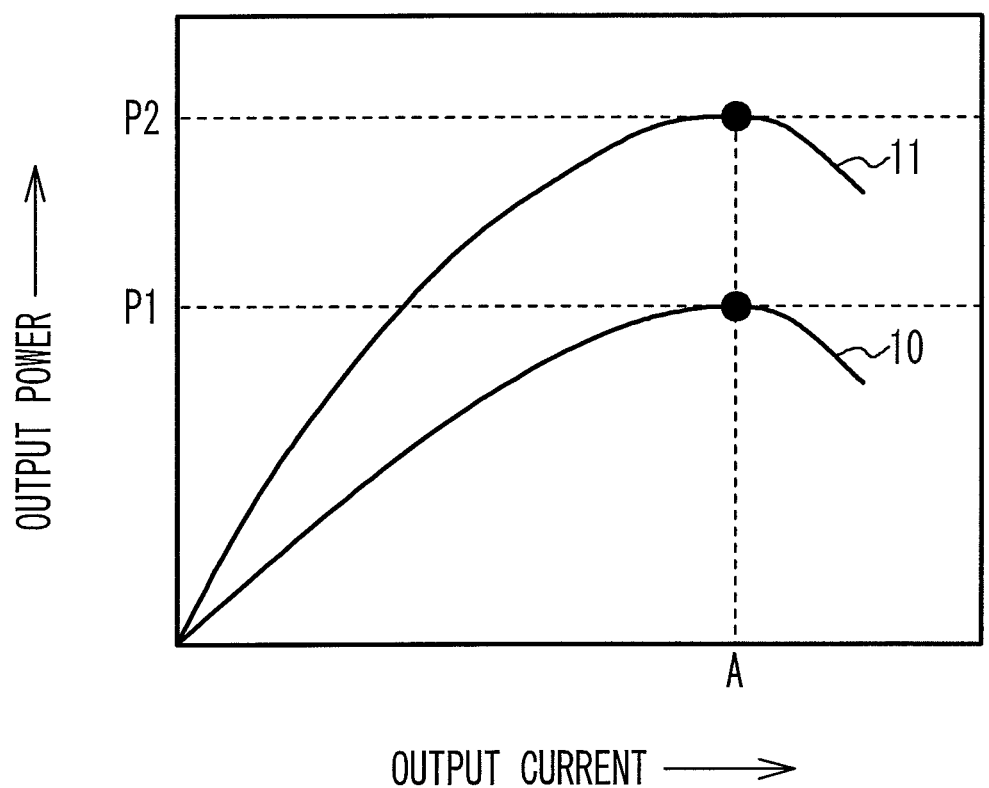
FIG. 2 is a current-power characteristics chart illustrating the relationship between output currents and output powers of a first fuel cell and a second fuel cell.

FIG. 2 is a current-power characteristics chart illustrating the relationship between the output current and the output power of each of the first fuel cell and the second fuel cell. As illustrated in FIG. 2, the maximum power output P2 of the second fuel cell 11 is higher than the maximum power output P1 of the first fuel cell 10. Further, the first fuel cell 10 and the second fuel cell 11 differ in the number of cells that are formed with the same material and have the same power generating area, and accordingly, differ in maximum power output. Because of this, the output current with which the first fuel cell 10 reaches the maximum power output P1, and the output current with which the second fuel cell 11 reaches the maximum power output P2 fall in the neighborhood of an output current A (or are the same output current A). Note that the second fuel cell 11 may have the same number of stacked cells as that in the first fuel cell 10, but differ in the material and/or the power generating area of the cells from the first fuel cell 10, to have the higher maximum power output.

When a maximum allowable current and/or a minimum allowable voltage is set for the output current and/or the output voltage of each of the first fuel cell 10 and the second fuel cell 11 to avoid a rapid voltage drop or reduce heat generation from the fuel cells, the maximum power output of each of the first fuel cell 10 and the second fuel cell 11 may be an output power that becomes highest within the allowable range.

Figure 3:
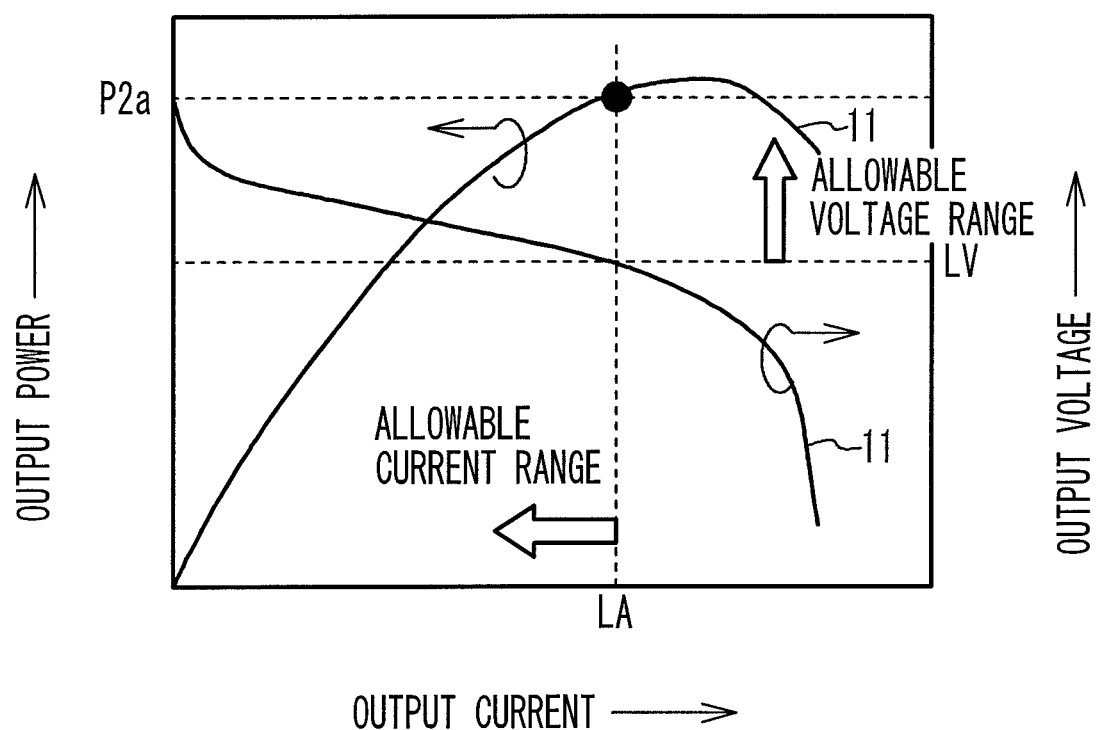
FIG. 3 is a chart for describing the maximum power output when a maximum allowable current and a minimum allowable voltage are set in the second fuel cell.

FIG. 3 is a chart for describing the maximum power output when a maximum allowable current and a minimum allowable voltage are set in the second fuel cell. As illustrated in FIG. 3, when a maximum allowable current LA and/or a minimum allowable voltage LV is set, the maximum power output P2a within the allowable current range and/or the allowable voltage range may be the maximum power output of the second fuel cell 11. The same applies to the first fuel cell 10.

As illustrated in FIG. 1, the control unit 20 receives an accelerator position signal transmitted from an accelerator pedal sensor 67 that detects the position of an accelerator pedal 66 (or the pressure applied onto the accelerator pedal 66 by the driver). The control unit 20 calculates the requested power from the accelerator position signal, and controls the later described components of the fuel cell system 100 in accordance with the calculated requested power, to control power generation from the first fuel cell 10 and the second fuel cell 11. In other words, the control unit 20 functions as a power generation controller 22 that controls power generation from the first fuel cell 10 and the second fuel cell 11. Here, the electric power requested from the entire fuel cell system 100 including the first fuel cell 10 and the second fuel cell 11 is first calculated in accordance with the accelerator position. When the fuel cell system 100 includes a secondary cell, the charging status of the secondary cell may be detected, and the electric powers requested from the first fuel cell 10 and the second fuel cell 11 may be calculated while the electric power being stored into and released from the secondary cell is taken into account.

The cathode gas piping system 30 supplies the cathode gas to the first fuel cell 10, and releases a cathode exhaust gas that is the gas not consumed in the first fuel cell 10. The cathode gas piping system 30 includes a cathode gas pipe 31, an air compressor 32, an open/close valve 33, a cathode exhaust gas pipe 34, and a pressure adjusting valve 35. The cathode gas pipe 31 is a pipe connected to a cathode inlet of the first fuel cell 10. The air compressor 32 is connected to the cathode of the first fuel cell 10 via the cathode gas pipe 31, and supplies air that is taken from outside and compressed, as the cathode gas to the first fuel cell 10. The control unit 20 controls driving of the air compressor 32, to control the amount of the air to be supplied to the first fuel cell 10. The open/close valve 33 is disposed between the air compressor 32 and the first fuel cell 10, and opens/closes in accordance with the flow of the air in the cathode gas pipe 31. For example, the open/close valve 33 is normally in a closed state, and opens when air at a predetermined pressure is supplied from the air compressor 32 to the cathode gas pipe 31. The cathode exhaust gas pipe 34 is a pipe connected to a cathode outlet of the first fuel cell 10, and releases the cathode exhaust gas to the outside of the fuel cell system 100. The pressure adjusting valve 35 adjusts the pressure on the cathode exhaust gas in the cathode exhaust gas pipe 34.

The cathode gas piping system 40 supplies the cathode gas to the second fuel cell 11, and releases a cathode exhaust gas that is the gas not consumed in the second fuel cell 11. The cathode gas piping system 40 includes a cathode gas pipe 41, an air compressor 42, an open/close valve 43, a cathode exhaust gas pipe 44, and a pressure adjusting valve 45. The cathode gas pipe 41, the air compressor 42, the open/close valve 43, the cathode exhaust gas pipe 44, and the pressure adjusting valve 45 have the same functions as those of the cathode gas pipe 31, the air compressor 32, the open/close valve 33, the cathode exhaust gas pipe 34, and the pressure adjusting valve 35 of the cathode gas piping system 30. Accordingly, the control unit 20 controls driving of the air compressor 42, to control the amount of the air to be supplied to the second fuel cell 11.

The anode gas piping system 50 supplies the anode gas to the first fuel cell 10, and releases an anode exhaust gas that is the gas not consumed in the first fuel cell 10. The anode gas piping system 50 includes an anode gas pipe 51, an open/close valve 52, a regulator 53, an injector 54, an anode exhaust gas pipe 55, a gas-liquid separator 56, an anode gas circulating pipe 57, a circulating pump 58, an anode drain pipe 59, and a drain valve 60. The anode gas pipe 51 is a pipe that connects a hydrogen tank 65 and an anode inlet of the first fuel cell 10. In other words, the hydrogen tank 65 is connected to the anode of the first fuel cell 10 via the anode gas pipe 51, and supplies hydrogen stored in the tank to the first fuel cell 10. The open/close valve 52, the regulator 53, and the injector 54 are disposed in the anode gas pipe 51 in this order from the upstream side. The open/close valve 52 opens/closes in accordance with an instruction from the control unit 20, to control the flow of hydrogen from the hydrogen tank 65 to the upstream side of the injector 54. The regulator 53 is a pressure reducing valve for adjusting the pressure on the hydrogen on the upstream side of the injector 54. The injector 54 is an electromagnetically-driven open/close valve that is electromagnetically driven by a valve unit in accordance with a drive cycle and a valve opening time that are set by the control unit 20. The control unit 20 controls the drive cycle and/or the valve opening time of the injector 54, to control the amount of the hydrogen to be supplied to the first fuel cell 10.

The anode exhaust gas pipe 55 is a pipe that connects an anode outlet of the first fuel cell 10 and the gas-liquid separator 56, and introduces an anode exhaust gas containing an unreacted gas (such as hydrogen and nitrogen) not used in any power generating reaction into the gas-liquid separator 56. The gas-liquid separator 56 separates the gas component and the water contained in the anode exhaust gas from each other. The gas-liquid separator 56 then introduces the gas component into the anode gas circulating pipe 57, and introduces the water into the anode drain pipe 59. The anode gas circulating pipe 57 is connected to the anode gas pipe 51 on the downstream side of the injector 54. The circulating pump 58 is disposed in the anode gas circulating pipe 57. The hydrogen contained in the gas component separated by the gas-liquid separator 56 is sent into the anode gas pipe 51 by the circulating pump 58. The circulating pump 58 is driven in accordance with an instruction from the control unit 20. The anode drain pipe 59 is a pipe for releasing the water separated by the gas-liquid separator 56 to the outside of the fuel cell system 100. The drain valve 60 is disposed in the anode drain pipe 59, and opens/closes in accordance with an instruction from the control unit 20.

The anode gas piping system 70 supplies the anode gas to the second fuel cell 11, and releases an anode exhaust gas that is the gas not consumed in the second fuel cell 11. The anode gas piping system 70 includes an anode gas pipe 71, an open/close valve 72, a regulator 73, an injector 74, an anode exhaust gas pipe 75, a gas-liquid separator 76, an anode gas circulating pipe 77, a circulating pump 78, an anode drain pipe 79, and a drain valve 80. The anode gas pipe 71, the open/close valve 72, the regulator 73, the injector 74, the anode exhaust gas pipe 75, the gas-liquid separator 76, the anode gas circulating pipe 77, the circulating pump 78, the anode drain pipe 79, and the drain valve 80 have the same functions as those of the anode gas pipe 51, the open/close valve 52, the regulator 53, the injector 54, the anode exhaust gas pipe 55, the gas-liquid separator 56, the anode gas circulating pipe 57, the circulating pump 58, the anode drain pipe 59, and the drain valve 60 of the anode gas piping system 50. Accordingly, the control unit 20 controls the drive cycle and/or the valve opening time of the injector 74, to control the amount of the hydrogen to be supplied to the second fuel cell 11.

Figure 4:
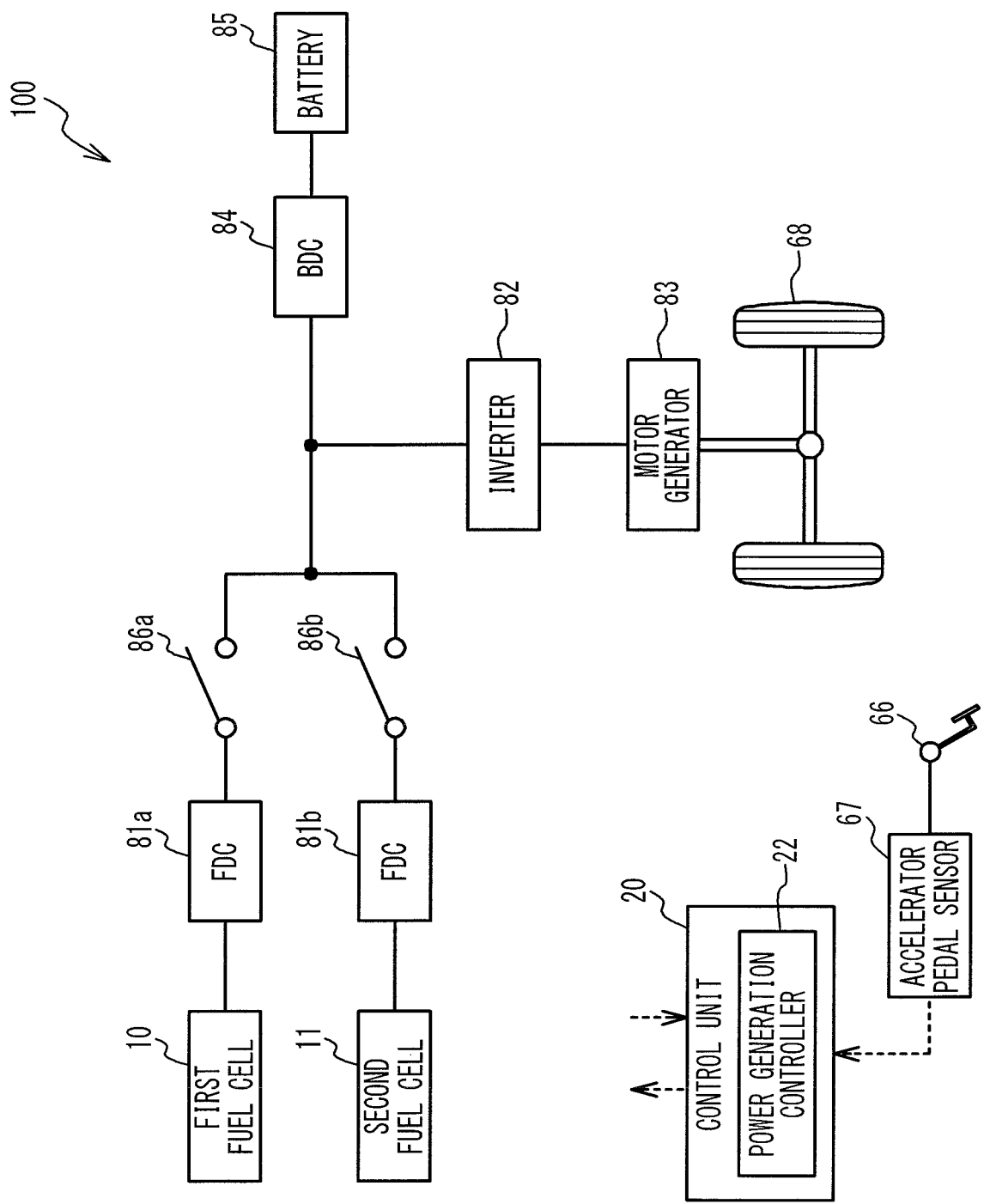
FIG. 4 is a schematic diagram illustrating the electrical configuration of the fuel cell system according to the first embodiment.

FIG. 4 is a schematic diagram illustrating the electrical configuration of the fuel cell system according to the first embodiment. The fuel cell system 100 includes FDCs 81a and 81b, an inverter 82, a motor generator 83, a BDC 84, a battery 85, and switches 86a and 86b, in addition to the control unit 20 and the others described above.

The FDCs 81a and 81b are DC-DC converters. The FDC 81a transforms the output voltage of the first fuel cell 10, and supplies the result to the inverter 82 and the BDC 84. The FDC 81b transforms the output voltage of the second fuel cell 11, and supplies the result to the inverter 82 and the BDC 84. The BDC 84 is a DC-DC converter. The battery 85 is a secondary cell capable of charging and discharging. The BDC 84 can adjust a DC voltage from the battery 85 and output the result to the inverter 82, and can adjust DC voltages from the first fuel cell 10 and the second fuel cell 11 and a voltage that has been output from the motor generator 83 and converted into a DC voltage by the inverter 82, and outputs the results to the battery 85. The inverter 82 is a DC-AD inverter. The inverter 82 converts DC powers output from the first and second fuel cells 10 and 11 and the battery 85, and supplies the results to the motor generator 83. The motor generator 83 drives wheels 68. The switches 86a and 86b open/close in accordance with an instruction from the control unit 20, to switch between electrical connection and disconnection between the first and second fuel cells 10 and 11 and the motor generator 83.

The control unit 20 includes a microcomputer that includes a central processing unit (CPU), a random access unit (RAM), a read only memory (ROM), and a storage unit. The storage unit is a nonvolatile memory such as a hard disk drive (HDD) or a flash memory, for example. The control unit 20 comprehensively controls the respective components of the fuel cell system 100, to control operation of the fuel cell system 100. For example, the control unit 20 acquires an accelerator position signal from the accelerator pedal sensor 67 that detects a position of the accelerator pedal 66, and calculates the requested power from the acquired accelerator position signal. The control unit 20 then functions as the power generation controller 22 that controls the amounts of the gases to be supplied to the first fuel cell 10 and the second fuel cell 11, the duty ratios of the FDCs 81a and 81b, and the like in accordance with the requested power, to control power generation from the first fuel cell 10 and the second fuel cell 11. The power generation controller 22 controls the air compressors 32 and 42, for example, to control the amount of the cathode gas to be supplied to the first fuel cell 10 and the second fuel cell 11. The power generation controller 22 controls the injectors 54 and 74, the circulating pumps 58 and 78, and the like, to control the amount of the anode gas to be supplied to the first fuel cell 10 and the second fuel cell 11.

Figure 5:
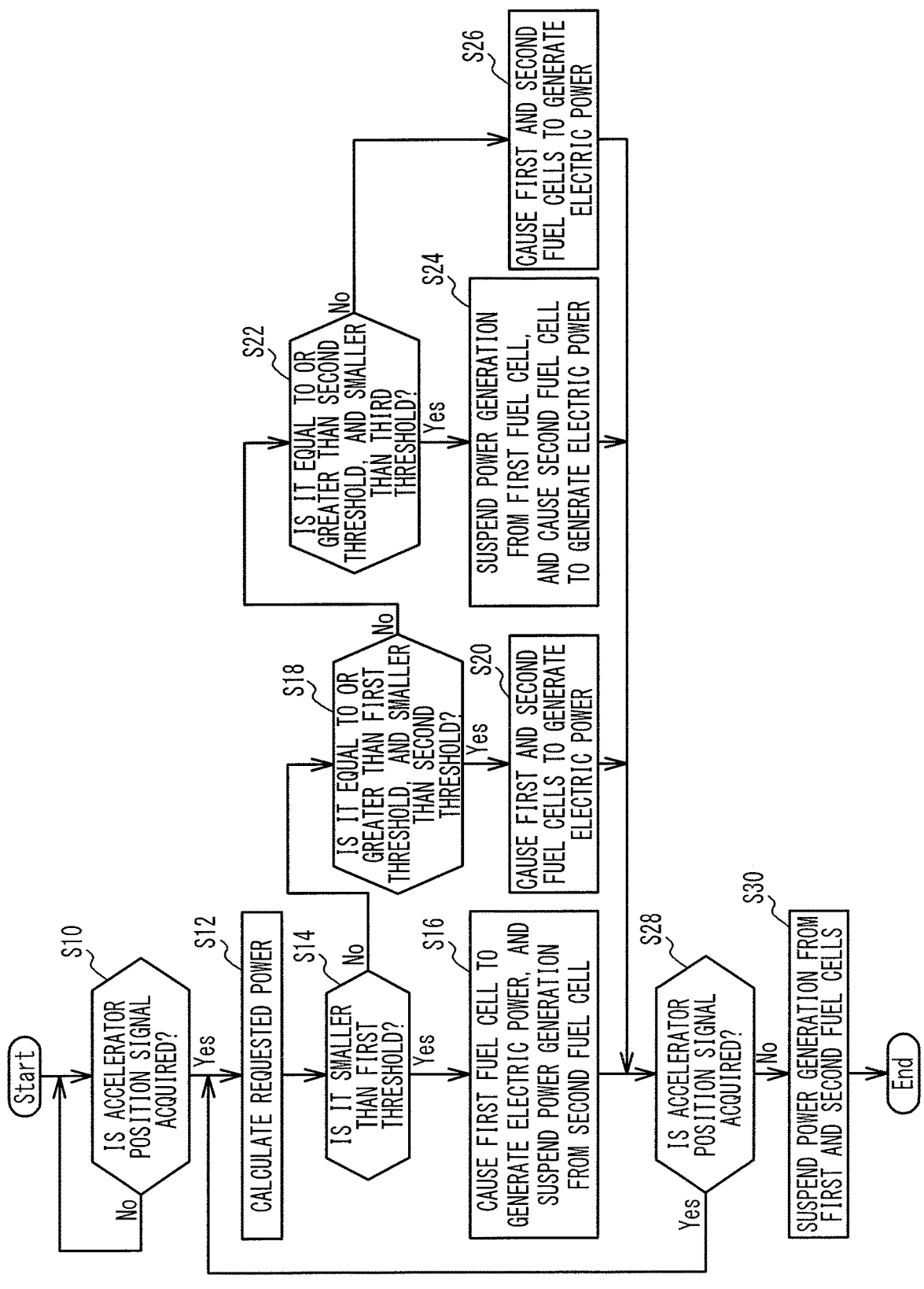
FIG. 5 is a flowchart illustrating a power generation control process in the first embodiment.
Figure 6:
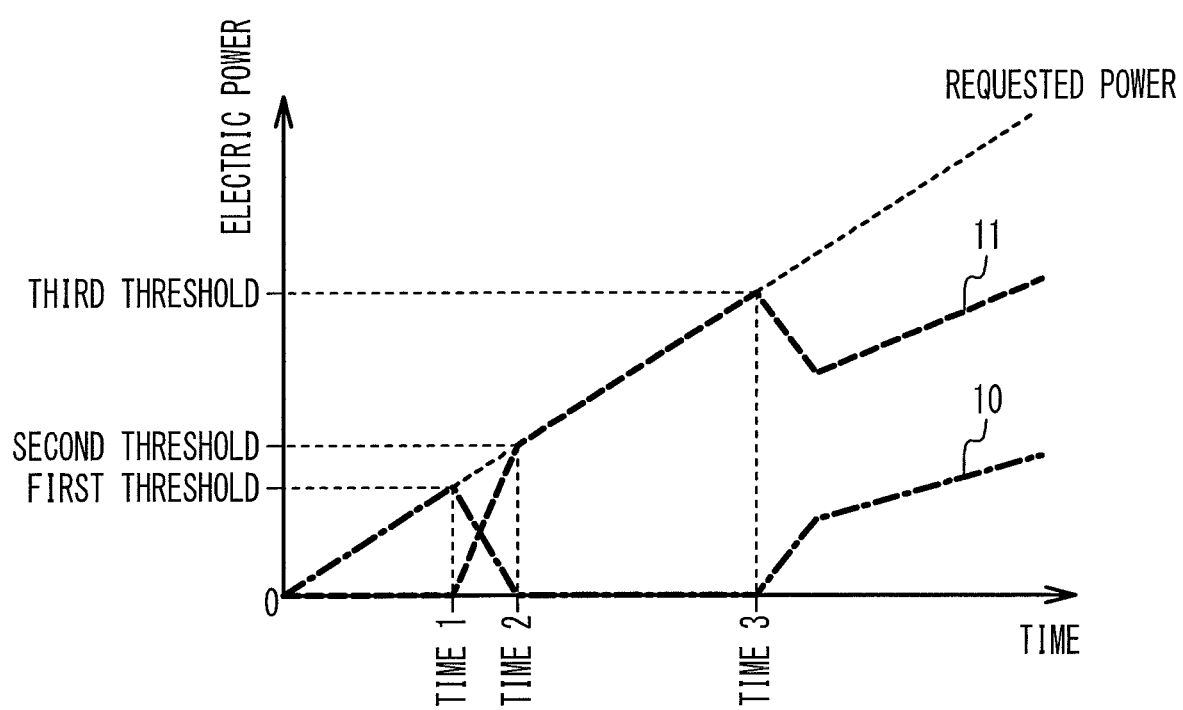
FIG. 6 is a timing chart for describing power generation control in the first embodiment.

FIG. 5 is a flowchart illustrating a power generation control process in the first embodiment. FIG. 6 is a timing chart for describing power generation control in the first embodiment. As illustrated in FIG. 5, the control unit 20 stands by until acquiring an accelerator position signal transmitted from the accelerator pedal sensor 67 (step S10). After acquiring an accelerator position signal (step S10: Yes), the control unit 20 calculates the requested power in accordance with the accelerator position signal (step S12). For example, the control unit 20 refers to a map that is stored in the storage unit and shows the relationship between the accelerator position signal and requested power, to calculate the requested power from the acquired accelerator position signal.

The control unit 20 then determines whether the calculated requested power is smaller than a first threshold (step S14). The first threshold may be a value that is not smaller than 70% and not greater than 100% of the maximum power output of the first fuel cell 10, for example. The first threshold is stored in the storage unit of the control unit 20, for example. Note that the first threshold may be determined from the maximum power output of the first fuel cell 10 in the initial state, or may be determined from the maximum power output of the first fuel cell 10 acquired at a predetermined time, because the maximum power output of the first fuel cell 10 decreases depending on usage conditions.

When the control unit 20 determines the requested power to be smaller than the first threshold in step S14 (step S14: Yes), the control unit 20 controls the respective components of the fuel cell system 100, to cause the first fuel cell 10 to generate electric power so that the requested power is provided by the first fuel cell 10, and suspend power generation from the second fuel cell 11 (step S16). Specifically, the control unit 20 controls the air compressor 32, the injector 54, and the like, so that necessary amounts of air and hydrogen for power generation to provide the requested power are supplied to the first fuel cell 10. The control unit 20 also stops the driving of the air compressor 42, the injector 74, and the like, so that air and hydrogen are not supplied to the second fuel cell 11. Thus, as illustrated in FIG. 6, the requested power is provided by power generation from the first fuel cell 10 before time 1 until which the requested power is smaller than the first threshold. Note that, in this case, the control unit 20 electrically connects the first fuel cell 10 and the motor generator 83 by turning on the switch 86a, and cuts off the electrical connection between the second fuel cell 11 and the motor generator 83 by turning off the switch 86b. As the switch 86b is turned off, and the electrical connection between the second fuel cell 11 and the motor generator 83 is cut off, power generation from the second fuel cell 11 can be suspended even in a situation where the reaction gases are being supplied to the second fuel cell 11.

When the control unit 20 determines the requested power not to be smaller than the first threshold in step S14 (step S14: No), the control unit 20 determines whether the requested power is equal to or greater than the first threshold and is smaller than a second threshold that is greater than the first threshold (step S18). The second threshold is stored in the storage unit of the control unit 20, for example.

When the control unit 20 determines that the requested power is equal to or greater than the first threshold and is smaller than the second threshold in step S18 (step S18: Yes), the control unit 20 controls the respective components of the fuel cell system 100, and causes both the first fuel cell 10 and the second fuel cell 11 to generate electric power to provide the requested power (step S20). In other words, the control unit 20 controls the air compressor 32, the injector 54, and the like, so that air and hydrogen are supplied to the first fuel cell 10. The control unit 20 also drives the air compressor 42, the injector 74, and the like, so that air and hydrogen are supplied to the second fuel cell 11. With this, during the period from time 1 to time 2, during which the requested power is equal to or greater than the first threshold and is smaller than the second threshold, as illustrated in FIG. 6, the requested power is provided by both the power generation from the first fuel cell 10 and the power generation from the second fuel cell 11. Note that, in this case, the control unit 20 turns on the switches 86a and 86b, to electrically connect the first and second fuel cells 10 and 11 to the motor generator 83.

In this case, the control unit 20 preferably controls driving of the air compressor 32, the injector 54, and the like, so that the output power of the first fuel cell 10 decreases in response to the increase in the requested power. Further, the control unit 20 preferably controls the air compressor 42, the injector 74, and the like, so that the output power of the second fuel cell 11 increases in response to the increase in the requested power. The reason that both the first fuel cell 10 and the second fuel cell 11 are made to generate electric power as described above when the requested power is equal to and greater than the first threshold and is smaller than the second threshold will be described later.

When the control unit 20 determines the requested power not to be equal to or greater than the first threshold and not to be smaller than the second threshold in step S18 (step S18: No), the control unit 20 determines whether the requested power is equal to or greater than the second threshold and is smaller than a third threshold that is greater than the second threshold, is equal to or greater than 70% of the maximum power output of the second fuel cell 11, and is equal to or smaller than 100% of the maximum power output of the second fuel cell 11 (step S22). The third threshold is stored in the storage unit of the control unit 20, for example. Note that the third threshold may be determined from the maximum power output of the second fuel cell 11 in the initial state, or may be determined from the maximum power output of the second fuel cell 11 acquired at a predetermined time, because the maximum power output of the second fuel cell 11 decreases depending on usage conditions.

When the control unit 20 determines that the requested power is equal to or greater than the second threshold and is smaller than the third threshold in step S22 (step S22: Yes), the control unit 20 controls the respective components of the fuel cell system 100, to suspend the power generation from the first fuel cell 10, and cause the second fuel cell 11 to generate electric power so that the requested power is provided by the second fuel cell 11 (step S24). In other words, the control unit 20 stops the driving of the air compressor 32, the injector 54, and the like, so that air and hydrogen are not supplied to the first fuel cell 10. The control unit 20 also drives the air compressor 42, the injector 74, and the like, so that the necessary amounts of air and hydrogen for power generation to provide the requested power are supplied to the second fuel cell 11. As a result, during the period from time 2 to time 3, during which the requested power is equal to or greater than the second threshold and is smaller than the third threshold, as illustrated in FIG. 6, the requested power is provided by power generation from the second fuel cell 11. Note that, in this case, the control unit 20 turns on the switch 86b to electrically connect the second fuel cell 11 and the motor generator 83, and turns off the switch 86a to cut off the electrical connection between the first fuel cell 10 and the motor generator 83. As the switch 86a is turned off to cut off the electrical connection between the first fuel cell 10 and the motor generator 83, the power generation from the first fuel cell 10 can be suspended even in a situation where the reaction gases are being supplied to the first fuel cell 10.

As described above, when the requested power is smaller than the first threshold, the requested power is provided primarily by power generation from the first fuel cell 10. When the requested power is equal to or greater than the second threshold, which is greater than the first threshold, and is smaller than the third threshold, which is greater than the second threshold, the requested power is provided primarily by power generation from the second fuel cell 11. For example, when the second threshold has the same value as the first threshold and the requested power increases to the first threshold (or the second threshold), the power generation from the first fuel cell 10 is suspended, and the second fuel cell 11 is made to generate electric power, to provide the requested power. However, there are cases where it is difficult to rapidly increase the power generation amount of the second fuel cell 11 to the requested power amount. Likewise, when the requested power decreases to the second threshold (or the first threshold), the power generation, from the second fuel cell 11 is suspended, and the first fuel cell 10 is made to generate electric power, to provide the requested power. However, there are cases where it is difficult to rapidly increase the power generation amount of the first fuel cell 10 to the requested power amount. This is because it is difficult to rapidly increase the amount of the air to be supplied from the air compressors 32 and 42 to the first fuel cell 10 and the second fuel cell 11, for example. For this reason, as in steps S18 and S20 in FIG. 5, when the requested power is equal to or greater than the first threshold and is smaller than the second threshold, which is greater than the first threshold, the reaction gases are supplied to both the first fuel cell 10 and the second fuel cell 11, to cause both the first fuel cell 10 and the second fuel cell 11 to generate electric power. With this, it is possible to rapidly adjust the power generation amount of the second fuel cell 11 to the requested power amount when the requested power increases to the second threshold, and it is possible to rapidly adjust the power generation amount of the first fuel cell 10 to the requested power amount when the requested power decreases to the first threshold.

For this reason, with the rates of increase in the power generation amounts of the first fuel cell 10 and the second fuel cell 11 being taken into account, the second threshold can be set at such a value that switching can be smoothly performed between power generation primarily from the first fuel cell 10 and power generation primarily from the second fuel cell 11. In other words, the second threshold can be set at such a value that the power generation amount of the second fuel cell 11 increases from almost 0 to the requested power amount when the requested power increases from the first threshold to the second threshold, and the power generation amount of the first fuel cell 10 increases from almost 0 to the requested power amount when the requested power decreases from the second threshold to the first threshold.

When the control unit 20 determines the requested power to be equal to or greater than the third threshold in step S22 (step S22: No), the control unit 20 causes both the first fuel cell 10 and the second fuel cell 11 to generate electric power to provide the requested power (step S26). With this, after time 3 at which the requested power becomes equal to or greater than the third threshold, the requested power is provided by both the power generation from the first fuel cell 10 and the power generation from the second fuel cell 11, as illustrated in FIG. 6. Note that, in this case, the control unit 20 turns on the switches 86a and 86b, to electrically connect the first and second fuel cells 10 and 11 to the motor generator 83.

The control unit 20 then determines whether there is an accelerator position signal acquired from the accelerator pedal sensor 67 (step S28). When there is an acquired accelerator position signal (step S28: Yes), the control unit 20 returns to step S12. When any accelerator position signal is no longer being acquired (step S28: No), the control unit 20 suspends the power generation from the first and second fuel cells 10 and 11 (step S30), and ends the power generation control process.

Figure 7A:
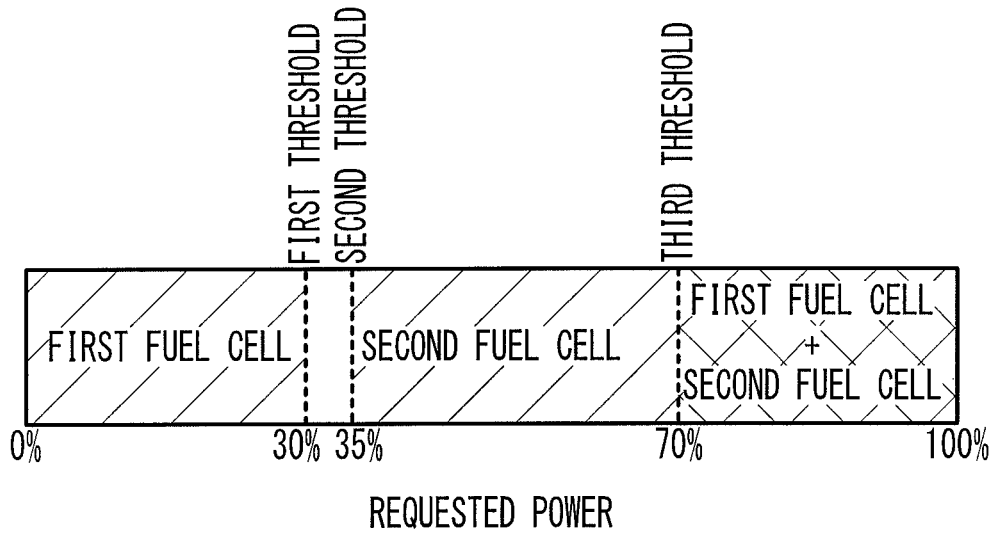
FIG. 7A and FIG. 7B are charts for describing power generation control in the first embodiment.
Figure 7B:
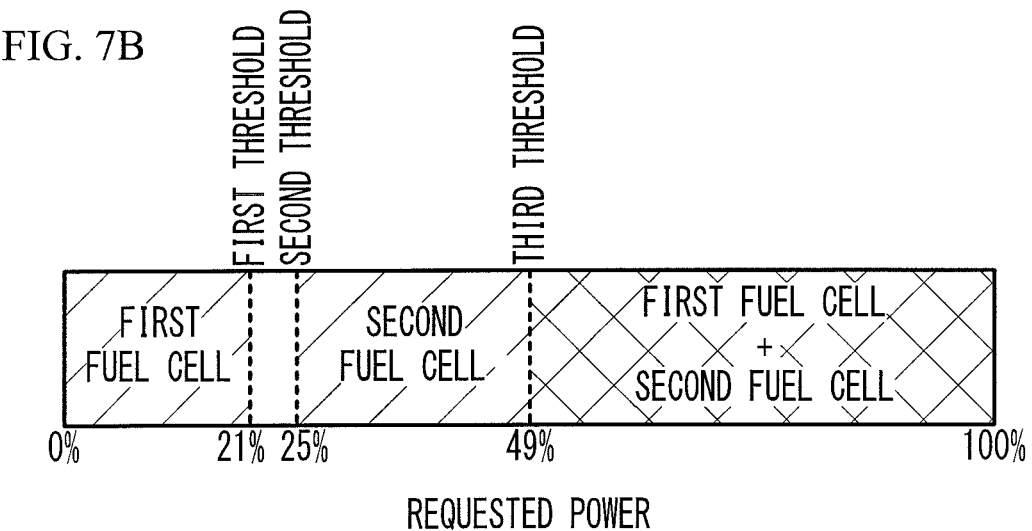

FIG. 7A and FIG. 7B are charts for describing power generation control in the first embodiment. Note that FIG. 7A and FIG. 7B illustrate an example in which the maximum power output of the first fuel cell 10 is 30%, and the maximum power output of the second fuel cell 11 is 70%, where the sum of the maximum power output of the first fuel cell 10 and the maximum power output of the second fuel cell 11 is 100% (the sum will be hereinafter also referred to as the total maximum power).

Since the first threshold is preferably equal to or greater than 70% of the maximum power output of the first fuel cell 10 and is equal to or smaller than 100% of the maximum power output of the first fuel cell 10, in FIG. 7A, a case where the first threshold is 100% of the maximum power output of the first fuel cell 10, which is 30% of the total maximum power, will be described as an example. In FIG. 7B, a case where the first threshold is 70% of the maximum power output of the first fuel cell 10, which is 21% of the total maximum power, will be described as an example. Since the third threshold is equal to or greater than 70% of the maximum power output of the second fuel cell 11 and is equal to or smaller than 100% of the maximum power output of the second fuel cell 11, in FIG. 7A, a case where the third threshold is 100% of the maximum power output of the second fuel cell 11, which is 70% of the total maximum power, will be described as an example. In FIG. 7B, a case where the third threshold is 70% of the maximum power output of the second fuel cell 11, which is 49% of the total maximum power, will be described as an example. In FIG. 7A, it is assumed that the second threshold is 35% of the total maximum power. In FIG. 7B, it is assumed that the second threshold is 25% of the total maximum power.

In FIG. 7A, when the requested power is smaller than 30% of the total maximum power (is smaller than the first threshold), the requested power is provided by power generation from the first fuel cell 10. When the requested power is equal to or greater than 35% of the total maximum power and is smaller than 70% of the total maximum power (is equal to or greater than the second threshold and is smaller than the third threshold), the requested power is provided by power generation from the second fuel cell 11. When the requested power is equal to or greater than 70% of the total maximum power (is equal to or greater than the third threshold), the requested power is provided by power generation from both the first fuel cell 10 and the second fuel cell 11.

In FIG. 7B, when the requested power is smaller than 21% of the total maximum power (is smaller than the first threshold), the requested power is provided by power generation from the first fuel cell 10. When the requested power is equal to or greater than 25% of the total maximum power and is smaller than 49% of the total maximum power (is equal to or greater than the second threshold and is smaller than the third threshold), the requested power is provided by power generation from the second fuel cell 11. When the requested power is equal to or greater than 49% of the total maximum power (is equal to or greater than the third threshold), the requested power is provided by power generation from both the first fuel cell 10 and the second fuel cell 11.

Figure 8A:
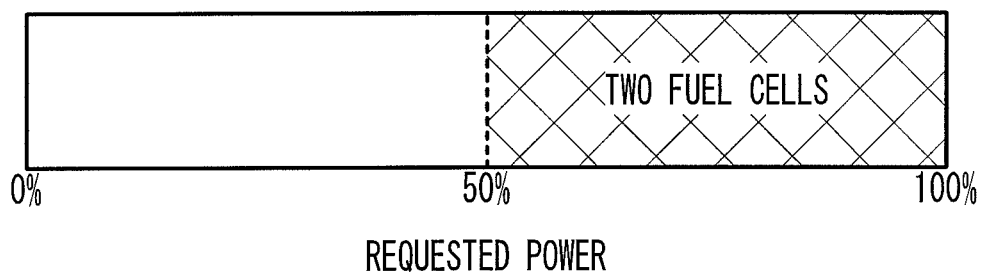
FIG. 8A and FIG. 8B are charts for describing power generation control in a comparative example.
Figure 8B:
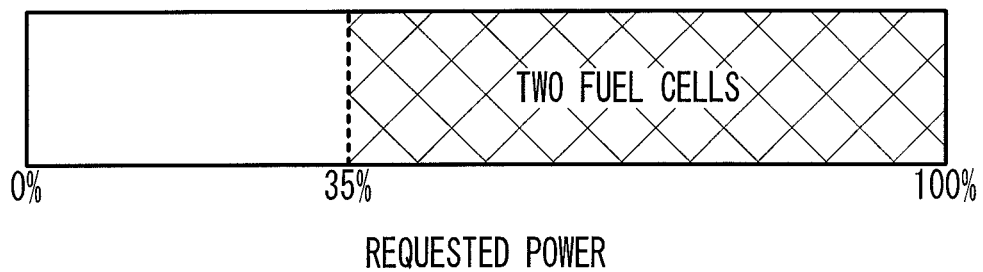

A fuel cell system that includes two fuel cells with the same maximum power outputs is now described as a comparative example. FIG. 8A and FIG. 8B are charts for describing power generation control in the comparative example. In FIG. 8A and FIG. 8B, the sum of the maximum power outputs of the two fuel cells is 100% (the sum will be hereinafter also referred to as the total maximum power), as in FIG. 7A and FIG. 7B. In the comparative example, the maximum power outputs of the two fuel cells are the same, and accordingly, the maximum power output of each of the two fuel cells is 50% of the total maximum power. Therefore, when the two fuel cells are made to operate to the maximum power outputs or when the requested power is greater than 50% of the total maximum power, the requested power is provided by power generation from both of the two fuel cells, as illustrated in FIG. 8A. That is, the requested power can be provided by power generation of one of the two fuel cells, only when the requested power is equal to or smaller than 50% of the total maximum power. As illustrated in FIG. 8B, when the two fuel cells are made to operate up to 70% of the maximum power outputs in consideration of power generation efficiency, or when the requested power is greater than 35% of the total maximum power, the requested power is to be provided by power generation from both the two fuel cells. That is, the requested power can be provided by power generation of one of the two fuel cells, only when the requested power is equal to or smaller than 35% of the total maximum power.

In the first embodiment, on the other hand, the maximum power output of the second fuel cell 11 is greater than that of the first fuel cell 10. When the requested power is smaller than the first threshold, the control unit 20 causes the first fuel cell 10 to generate electric power so that the requested power is provided by the first fuel cell 10. That is, when the requested power is smaller than the first threshold, the control unit 20 causes the first fuel cell 10 to generate electric power greater than the electric power of the second fuel cell 11 so that the requested power is supplied. When the requested power is equal to or greater than the second threshold, and is smaller than the third threshold that is greater than the second threshold, is equal to or greater than 70% of the maximum power output of the second fuel cell 11, and is equal to or smaller than 100% of the maximum power output of the second fuel cell 11, the second fuel cell 11 is made to generate electric power so that the requested power is provided by the second fuel cell 11. That is, when the requested power is equal to or greater than the second threshold, and is smaller than the third threshold that is greater than the second threshold, is equal to or greater than 70% of the maximum power output of the second fuel cell 11, and is equal to or smaller than 100% of the maximum power output of the second fuel cell 11, the second fuel cell 11 is made to generate electric power greater than the electric power of the first fuel cell 10 so that the requested power is supplied. When the requested power is equal to or greater than the third threshold, the first fuel cell 10 and the second fuel cell 11 are made to generate electric power so that the requested power is provided by both the first fuel cell 10 and the second fuel cell 11. That is, when the requested power is equal to or greater than the third threshold, both the first fuel cell 10 and the second fuel cell 11 are made to generate electric power so that the requested power is supplied. As described above, by setting the third threshold based on the maximum power output of the second fuel cell 11 having a larger maximum power output than the first fuel cell, the range in which the requested power is provided by power generation from one of the first fuel cell 10 and the second fuel cell 11 can be made larger than that in the comparative example that includes two fuel cells with the same maximum power outputs, as illustrated in FIG. 7A through FIG. 8B. That is, the time during which only the first fuel cell 10 generates electric power and/or the time during which only the second fuel cell 11 generates electric power can be made longer. As a result, the time during which power generation from the first fuel cell 10 and/or the second fuel cell 11 is suspended can be made longer. Thus, degradation due to potential variation during power generation from the first fuel cell 10 and/or the second fuel cell 11 can be reduced, and durability of the fuel cell system 100 can be improved.

To extend the time during which only the second fuel cell 11 generates electric power, the third threshold may have a value that is equal to or greater than 75% of the maximum power output of the second fuel cell 11, or may have a value that is equal to or greater than 80% of the maximum power output of the second fuel cell 11. In addition, to prevent decrease in power generation efficiency and/or prevent rapid decrease in voltage, the third threshold may have a value that is equal to or smaller than 95% of the maximum power output of the second fuel cell 11, or may have a value that is equal to or smaller than 90% of the maximum power output of the second fuel cell 11.

As illustrated in FIGS. 5 and 6, when the requested power is smaller than the first threshold, the control unit 20 suspends power generation from the second fuel cell 11. When the requested power is equal to or greater than the second threshold and is smaller than the third threshold, the control unit 20 suspends power generation from the first fuel cell 10. In this manner, the time during which power generation from the first fuel cell 10 and the second fuel cell 11 is suspended can be made longer, and durability of the fuel cell system 100 can be improved. Note that, the control unit 20 may suspend power generation from the second fuel cell 11 when the requested power is smaller than the first threshold, and/or suspend power generation from the first fuel cell 10 when the requested power is equal to or greater than the second threshold and is smaller than the third threshold.

As illustrated in FIG. 6, the second threshold has a greater value than the first threshold. When the requested power is equal to or greater than the first threshold and is smaller than the second threshold, the control unit 20 causes the first fuel cell 10 and the second fuel cell 11 to generate electric power so that the requested power is provided by both the first fuel cell 10 and the second fuel cell 11. As a result, the output power of the second fuel cell 11 can quickly provide the requested power when the requested power increases to the second threshold, and the output power of the first fuel cell 10 can quickly provide the requested power when the requested power decreases to the first threshold. In this case, when the requested power is equal to or greater than the first threshold and is smaller than the second threshold, the control unit 20 preferably decreases the output power of the first fuel cell 10 and increases the output power of the second fuel cell 11 in response to an increase in the requested power, as illustrated in FIG. 6.

A case where the first threshold is equal to or greater than 70% of the maximum power output of the first fuel cell 10 and is equal to or smaller than 100% of the maximum power output of the first fuel cell 10 has been described as an example, but this does not intend to suggest any limitation. To increase the time during which only the first fuel cell 10 generates electric power, the first threshold may have a value that is equal to or grater than 75% of the maximum power output of the first fuel cell 10, or may have a value that is equal to or greater than 80% of the maximum power output of the first fuel cell 10. In addition, to prevent decrease in power generation efficiency and/or prevent rapid decrease in voltage, the first threshold may have a value that is equal to or smaller than 95% of the maximum power output of the first fuel cell 10, or may have a value that is equal to or smaller than 90% of the maximum power output of the first fuel cell 10.

The third threshold preferably has a value that is greater than 50% of the total maximum power that is the sum of the maximum power output of the first fuel cell 10 and the maximum power output of the second fuel cell 11. With this configuration, the time during which the requested power is provided by power generation from both the first fuel cell 10 and the second fuel cell 11 can be made shorter than that in a case where the two fuel cells with the same maximum power outputs are provided. Accordingly, the time during which power generation from the first fuel cell 10 and/or the second fuel cell 11 is suspended can be made longer.

Second Embodiment

Figure 9:
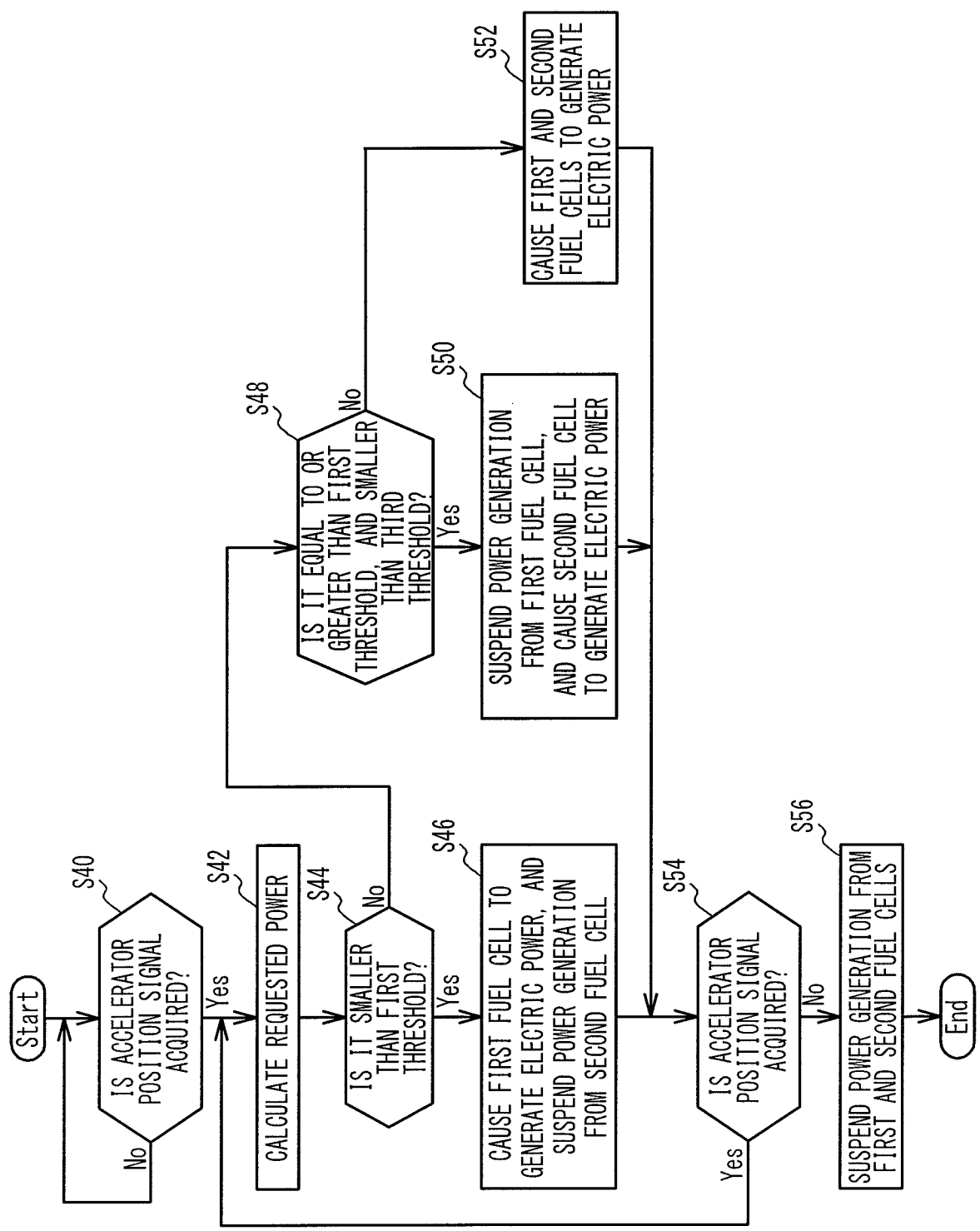
FIG. 9 is a flowchart illustrating a power generation control process in a second embodiment.
Figure 10:
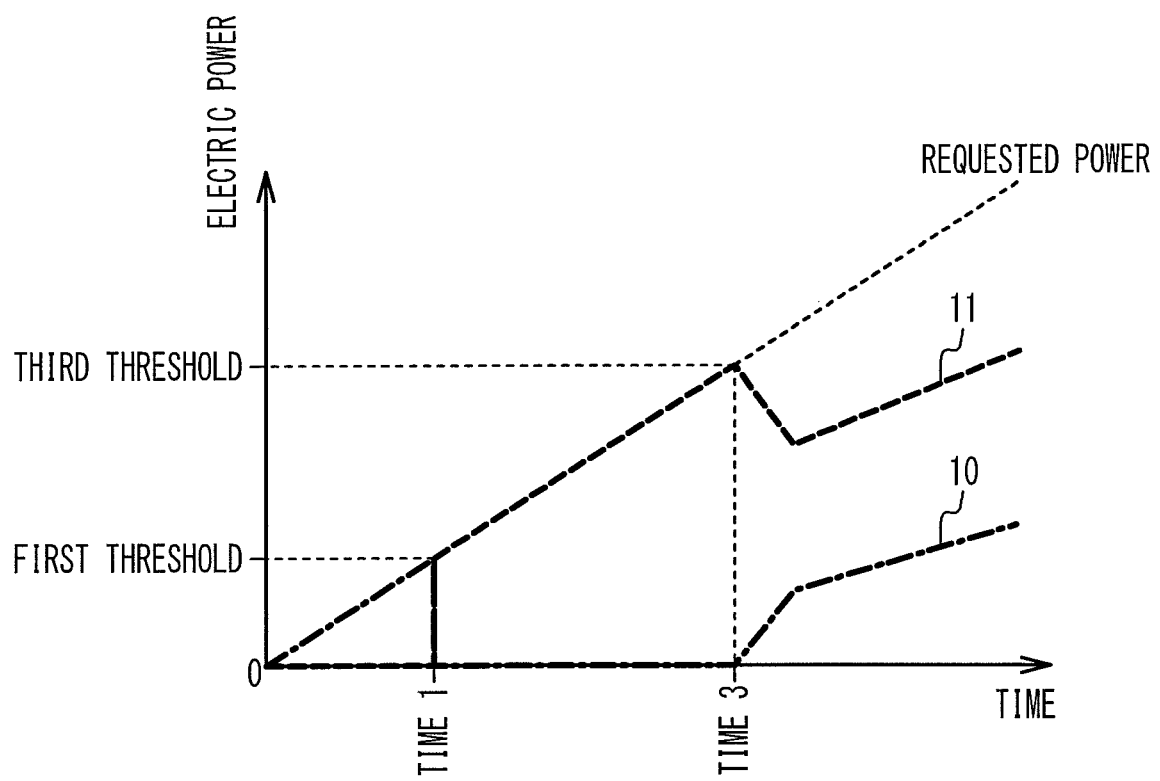
FIG. 10 is a timing chart for describing power generation control in the second embodiment.

The configuration of a fuel cell system according to a second embodiment is the same as that of the first embodiment illustrated in FIG. 1, and the electrical configuration thereof is the same as that of the first embodiment illustrated in FIG. 4. Therefore, those configurations are not explained herein. FIG. 9 is a flowchart illustrating a power generation control process in the second embodiment. FIG. 10 is a timing chart for describing power generation control in the second embodiment. As illustrated in FIG. 9, the control unit 20 first carries out steps S40 through S44. Steps S40 through S44 are the same as steps S10 through S14 of the first embodiment illustrated in FIG. 5, and therefore, are not explained herein.

When the control unit 20 determines the requested power to be smaller than the first threshold in step S44 (step S44: Yes), the control unit 20 causes the first fuel cell 10 to generate electric power so that the requested power is provided by the first fuel cell 10, and suspends the power generation from the second fuel cell 11 (step S46). As a result, the requested power is provided by the power generation from the first fuel cell 10 until time 1, before which the requested power is smaller than the first threshold, as illustrated in FIG. 10.

When the control unit 20 determines the requested power not to be smaller than the first threshold in step S44 (step S44: No), the control unit 20 then determines whether the requested power is equal to or greater than the first threshold and is smaller than the third threshold (step S48). When the control unit 20 determines that the requested power is equal to or greater than the first threshold and is smaller than the third threshold in step S48 (step S48: Yes), the control unit 20 suspends the power generation from the first fuel cell 10, and causes the second fuel cell 11 to generate electric power so that the requested power is provided by the second fuel cell 11 (step S50). As a result, during the period from time 1 to time 3, during which the requested power is equal to or greater than the first threshold and is smaller than the third threshold, the requested power is provided by the power generation from the second fuel cell 11, as illustrated in FIG. 10.

When the control unit 20 determines that the requested power is equal to or greater than the third threshold in step S48 (step S48: No), the control unit 20 causes both the first fuel cell 10 and the second fuel cell 11 to generate electric power to provide the requested power (step S52). As a result, after time 3 at which the requested power becomes equal to or greater than the third threshold, the requested power is provided by the power generation from both the first fuel cell 10 and the second fuel cell 11, as illustrated in FIG. 10.

The control unit 20 then determines whether there is an accelerator position signal acquired from the accelerator pedal sensor 67 (step S54). When there is an acquired accelerator position signal (step S54: Yes), the control unit 20 returns to step S42. When any accelerator position signal is no longer being acquired (step S54: No), on the other hand, the control unit 20 suspends the power generation from the first and second fuel cells 10 and 11 (step S56), and ends the power generation control process.

In the first embodiment, when the requested power is equal to or greater than the first threshold and is smaller than the second threshold that is greater than the first threshold, both the first fuel cell 10 and the second fuel cell 11 are made to generate electric power, so that the output power of the first fuel cell 10 and the second fuel cell 11 quickly provides the requested power. However, as described above, even when the reaction gases are being supplied to the first fuel cell 10, it is possible to suspend the power generation from the first fuel cell 10 by turning off the switch 86*a*. Even when the reaction gases are being supplied to the second fuel cell 11, it is possible to suspend the power generation from the second fuel cell 11 by turning off the switch 86b. Accordingly, it is possible to rapidly increase the output power of the first fuel cell 10 and the second fuel cell 11 to quickly provide the requested power, by controlling the reaction gases to be supplied to the first fuel cell 10 and the second fuel cell 11 and controlling the switching on and off of the switches 86a and 86b. Therefore, the second threshold may not be set (in other words, the second threshold may be set at the same value as the first threshold).

Figure 11:
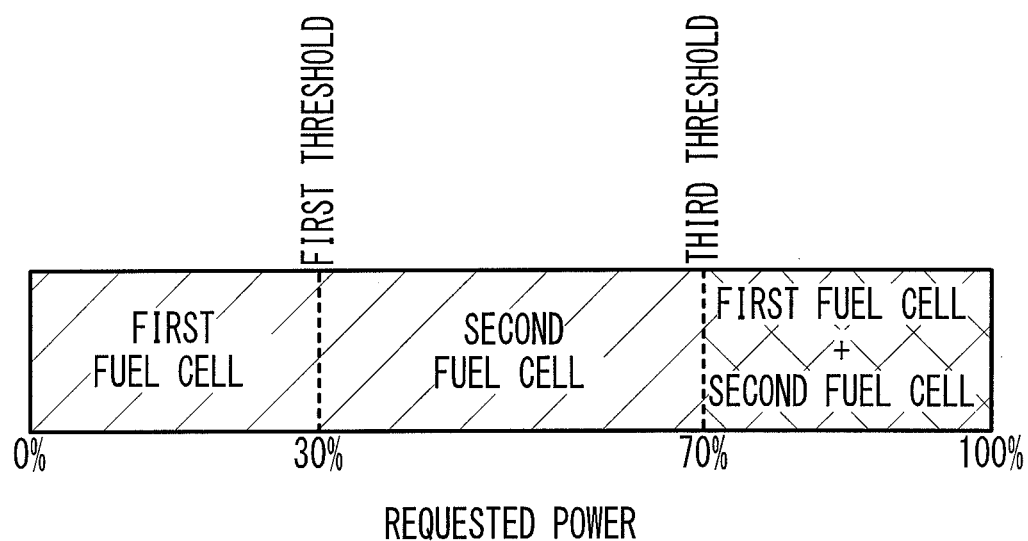
FIG. 11 is a chart for describing power generation control in the second embodiment.

FIG. 11 is a chart for describing power generation control in the second embodiment. In FIG. 11, the sum of the maximum power output of the first fuel cell 10 and the maximum power output of the second fuel cell 11 is 100%, the first threshold is 30% of the total maximum power, and the third threshold is 70% of the total maximum power, as in FIG. 7A. As illustrated in FIG. 11, when the requested power is smaller than 30% of the total maximum power (or smaller than the first threshold), the first fuel cell 10 is made to generate electric power to provide the requested power. When the requested power is equal to or greater than 30% and is smaller than 70% (or is equal to or greater than the first threshold and is smaller than the third threshold), the second fuel cell 11 is made to generate electric power to provide the requested power. When the requested power is equal to or greater than 70% of the total maximum power (or is equal to or greater than the third threshold), both the first fuel cell 10 and the second fuel cell 11 are made to generate electric power to provide the requested power. As the second threshold is not set (in other words, the second threshold is set at the same value as the first threshold) as described above, both the time during which only the first fuel cell 10 generates electric power and the time during which only the second fuel cell 11 generates electric power or one of the time during which only the first fuel cell 10 generates electric power and the time during which only the second fuel cell 11 can be made longer than that in the first embodiment. As a result, the time during which power generation from the first fuel cell 10 and/or the second fuel cell 11 is suspended can be made longer than that in the first embodiment. Thus, durability of the fuel cell system can be further improved.

Third Embodiment

Figure 12:
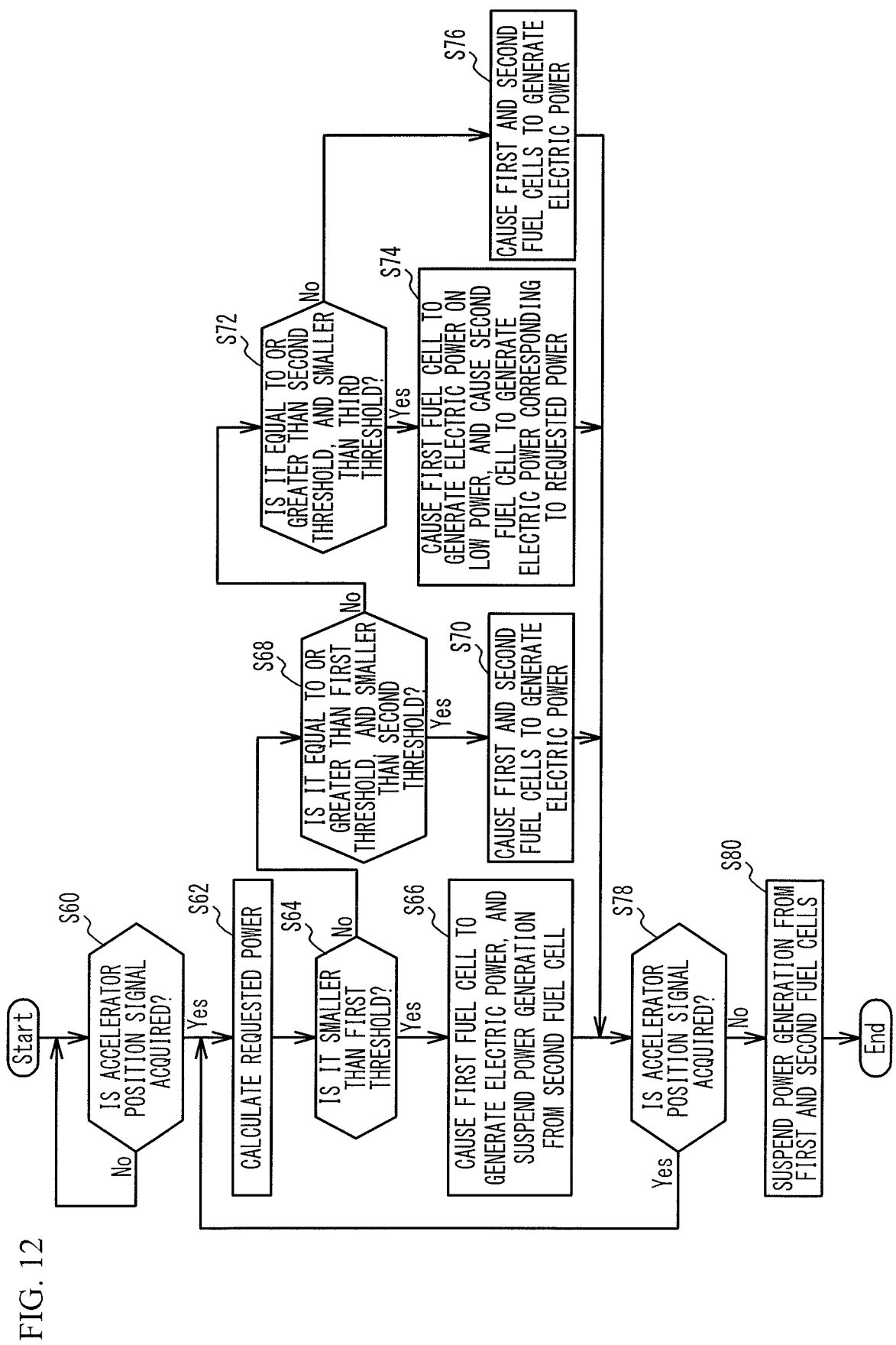
FIG. 12 is a flowchart describing a power generation control process in a third embodiment.
Figure 13:
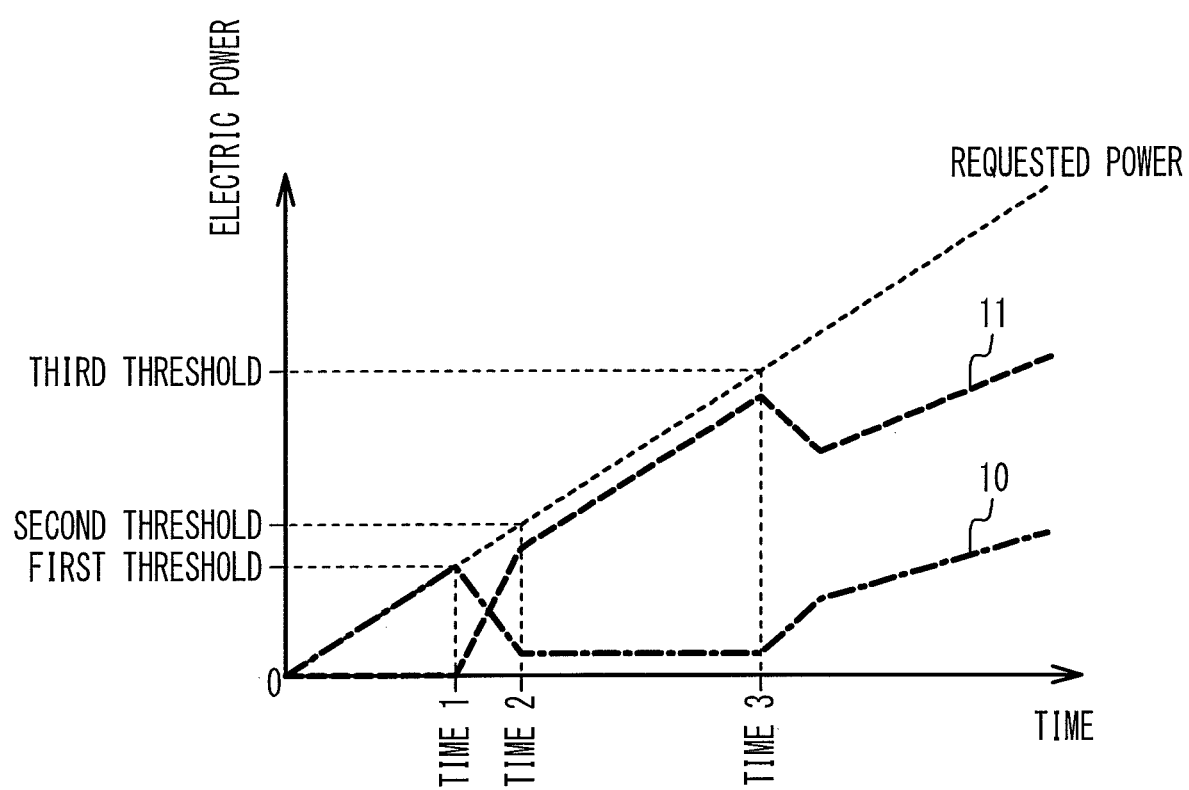
FIG. 13 is a timing chart for describing power generation control in the third embodiment.

The configuration of a fuel cell system according to a third embodiment is the same as that of the first embodiment illustrated in FIG. 1, and the electrical configuration thereof is the same as that of the first embodiment illustrated in FIG. 4. Therefore, those configurations are not explained herein. FIG. 12 is a flowchart illustrating a power generation control process in the third embodiment. FIG. 13 is a timing chart for describing power generation control in the third embodiment. As illustrated in FIG. 12, the control unit 20 first carries out steps S60 through S64. Steps S60 through S64 are the same as steps S10 through S14 of the first embodiment illustrated in FIG. 5, and therefore, are not explained herein.

When the control unit 20 determines the requested power to be smaller than the first threshold in step S64 (step S64: Yes), the control unit 20 causes the first fuel cell 10 to generate electric power so that the requested power is provided by the first fuel cell 10, and suspends the power generation from the second fuel cell 11 (step S66). As a result, the requested power is provided by the power generation from the first fuel cell 10 until time 1, before which the requested power is smaller than the first threshold, as illustrated in FIG. 13.

When the control unit 20 determines the requested power not to be smaller than the first threshold in step S64 (step S64: No), the control unit 20 then determines whether the requested power is equal to or greater than the first threshold and is smaller than the second threshold (step S68). When the control unit 20 determines that the requested power is equal to or greater than the first threshold and is smaller than the second threshold (step S68: Yes), the control unit 20 causes both the first fuel cell 10 and the second fuel cell 11 to generate electric power to provide the requested power (step S70). As a result, during the period from time 1 to time 2, during which the requested power is equal to or greater than the first threshold and is smaller than the second threshold, the requested power is provided by the power generation from both the first fuel cell 10 and the second fuel cell 11, as illustrated in FIG. 13.

When the control unit 20 determines the requested power not to be equal to or greater than the first threshold and not to be smaller than the second threshold in step S68 (step S68: No), the control unit 20 determines whether the requested power is equal to or greater than the second threshold and is smaller than the third threshold (step S72). When the control unit 20 determines that the requested power is equal to or greater than the second threshold and is smaller than the third threshold (step S72: Yes), the control unit 20 causes the first fuel cell 10 to generate electric power on low power while maintaining such a potential range that fuel cell degradation can be prevented, and causes the second fuel cell 11 to generate electric power equivalent to the difference between the requested power and the electric power being generated from the first fuel cell 10 (step S74). Here, a potential that can prevent fuel cell degradation is equivalent to a state in which the change in potential is small when the voltage per unit cell in the fuel cell is in the range of 0.7 V to 0.9 V. Note that the potential may be equivalent to a state in which the change in potential is small when the voltage per unit cell in the fuel cell is in the range of 0.7 V to 0.8 V, or a state in which the change in potential is small when the voltage per unit cell in the fuel cell is in the range of 0.75 V to 0.8 V. The control unit 20 drives the air compressor 32, the injector 54, and the like, so that the necessary amounts of air and hydrogen for the above power generation are supplied to the first fuel cell 10. While doing so, the control unit 20 controls the FDC 81a, so that electric power is generated at a substantially constant voltage to maintain the voltage per unit cell in the first fuel cell 10 in the range of 0.76 V to 0.78 V, for example. The reason that the voltage per unit cell is maintained in a predetermined range will be described later. The control unit 20 also drives the air compressor 42, the injector 74, and the like, so that the necessary amounts of air and hydrogen for generating an amount of electric power equivalent to the difference between the requested power and the electric power being generated from the first fuel cell 10 are supplied to the second fuel cell 11. As a result, during the period from time 2 to time 3, during which the requested power is equal to or greater than the second threshold and is smaller than the third threshold, as illustrated in FIG. 13, the requested power is provided primarily by the second fuel cell 11, and the first fuel cell 10 generates electric power at a constant voltage. Here, the requested power is provided primarily by the second fuel cell 11 when the first fuel cell 10 generates electric power at a constant voltage, and the second fuel cell 11 generates electric power equivalent to the difference between the requested power and the electric power being generated from the first fuel cell 10, as described above. For example, the requested power is provided primarily by the second fuel cell 11 when the output power of the second fuel cell 11 is equal to or greater than 85% of the requested power, where the output power of the second fuel cell 11 is equal to or greater than 90% of the requested power, or where the output power of the second fuel cell 11 is equal to or greater than 95% of the requested power.

When the control unit 20 determines that the requested power is equal to or greater than the third threshold in step S72 (step S72: No), the control unit 20 causes both the first fuel cell 10 and the second fuel cell 11 to generate electric power to provide the requested power (step S76). As a result, after time 3, at which the requested power becomes equal to or greater than the third threshold, the requested power is provided by the power generation from both the first fuel cell 10 and the second fuel cell 11, as illustrated in FIG. 13.

The control unit 20 then determines whether there is an accelerator position signal acquired from the accelerator pedal sensor 67 (step S78). When there is an acquired accelerator position signal (step S78: Yes), the control unit 20 returns to step S62. When any accelerator position signal is no longer being acquired (step S78: No), the control unit 20 suspends the power generation from the first and second fuel cells 10 and 11 (step S80), and ends the power generation control process.

In a fuel cell, an oxide coating is formed on a catalyst metal surface at high potential, and the oxide coating is removed at low potential. When the potential becomes high with the oxide coating of the catalyst removed, the catalyst is easily eluted, resulting in decrease in power generating performance. For example, when the requested power is equal to or greater than the second threshold and is smaller than the third threshold, and power generation from the first fuel cell 10 is completely stopped, the potential of the first fuel cell 10 becomes too high, and the power generating performance might be degraded due to elution of the catalyst. To counter this, when the requested power is equal to or greater than the second threshold and is smaller than the third threshold, the control unit 20 in the third embodiment causes the first fuel cell 10 to generate electric power at a constant voltage in such a range that elution of the catalyst contained in the first fuel cell 10 is inhibited, and causes the second fuel cell 11 to generate electric power equivalent to the difference between the requested power and the electric power being generated from the first fuel cell 10, so that the requested power is provided primarily by the second fuel cell 11. In this manner, the potential of the first fuel cell 10 can be prevented from become too high, and decrease in the power generating performance of the first fuel cell 10 can be prevented.

In the third embodiment, when the requested power is equal to or greater than the second threshold and is smaller than the third threshold, the first fuel cell 10 is made to generate electric power at a constant voltage. Instead of or in addition to that, when the requested power is smaller than the first threshold, the second fuel cell 11 may be made to generate electric power at a constant voltage in such a range that elution of the catalyst contained in the second fuel cell 11 is inhibited, and the first fuel cell 10 may be made to generate electric power equivalent to the difference between the requested power and the electric power being generated from the second fuel cell 11, so that the requested power can be provided primarily by the first fuel cell 10. In this manner, the potential of the second fuel cell 11 can be prevented from becoming too high, and decrease in the power generating performance of the second fuel cell 11 can be prevented. Here, the requested power is provided primarily by the first fuel cell 10 when the second fuel cell 11 generates electric power at a constant voltage, and the first fuel cell 10 generates electric power equivalent to the difference between the requested power and the electric power being generated from the second fuel cell 11. For example, the requested power is provided primarily by the first fuel cell 10 when the output power of the first fuel cell 10 is equal to or greater than 85% of the requested power, is equal to or greater than 90% of the requested power, or is equal to or greater than 95% of the requested power.

In the first through third embodiments, the first threshold, the second threshold, and the third threshold may be fixed values that are not allowed to be changed, or may be variable values that can be changed. When the rate of change in the requested power is equal to or higher than a predetermined value, the first threshold and/or the third threshold may be made smaller than in a case where the rate of change in the requested power is lower than the predetermined value. As a result, the requested power can be provided by power generation from the first fuel cell 10 and the second fuel cell 11 even when the requested power rapidly changes. Further, when a power mode (power performance priority control) and an ecological mode (fuel efficiency priority control) are set, and the power mode is selected, the control unit 20 may make the first threshold and/or the third threshold smaller than in a case where the ecological mode is selected.

Fourth Embodiment

Figure 14:
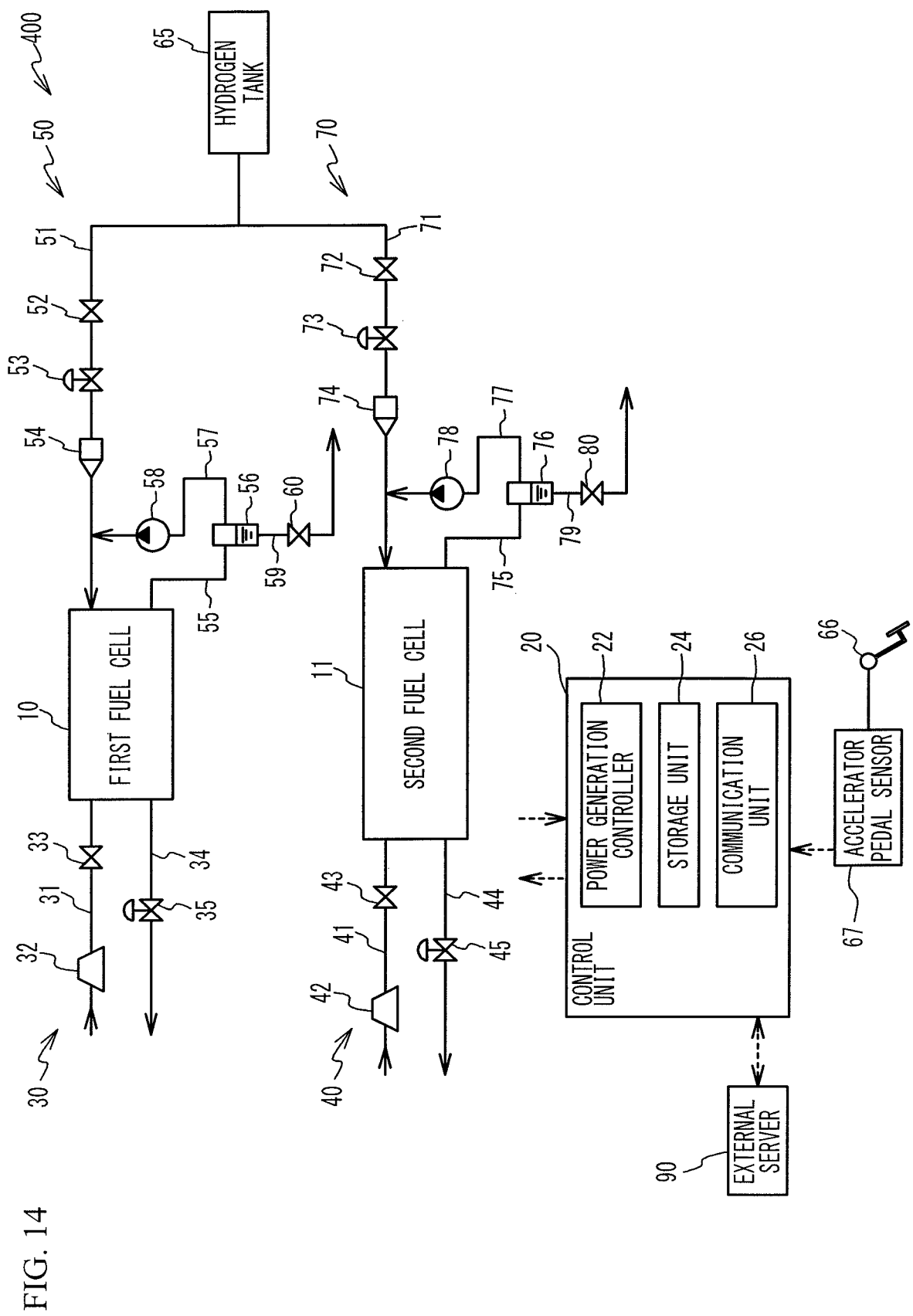
FIG. 14 is a schematic diagram illustrating the configuration of a fuel cell system according to a fourth embodiment.
Figure 15:
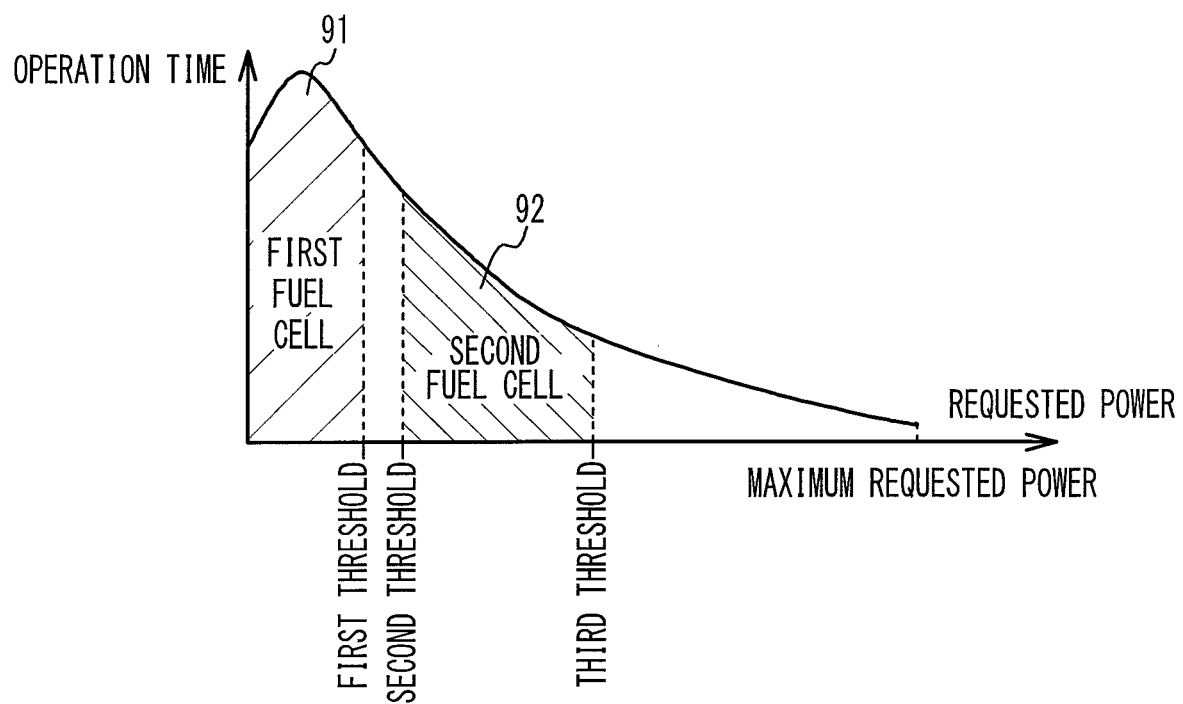
FIG. 15 is a chart illustrating an example of an operation history stored in a storage unit.

FIG. 14 is a schematic diagram illustrating the configuration of a fuel cell system according to a fourth embodiment. As illustrated in FIG. 14, in a fuel cell system 400 according to the fourth embodiment, the control unit 20 includes a storage unit 24 and a communication unit 26, as well as the power generation controller 22. The storage unit 24 stores an operation history of the vehicle equipped with the fuel cell system 400, for example. FIG. 15 is a chart illustrating an example of the operation history stored in the storage unit 24. As illustrated in FIG. 15, the operation history stored in the storage unit 24 is a map showing the correlation between the requested power and operation times of the first fuel cell 10 and the second fuel cell 11. In FIG. 15, the first fuel cell 10 is primarily operated in a region 91 where the requested power is smaller than the first threshold, and the second fuel cell 11 is primarily operated in a region 92 where the requested power is equal to or greater than the second threshold and is smaller than the third threshold. The communication unit 26 will be described later.

On the basis of the operation history stored in the storage unit 24, the control unit 20 may change the first threshold and the third threshold so that the first fuel cell 10 and the second fuel cell 11 have substantially the same degree of degradation. For example, based on the operation history that is a map stored in the storage unit and showing the correlation between the requested power and the operation time as illustrated in FIG. 15, the control unit 20 may change the first threshold and/or the third threshold so that the operation time of the first fuel cell 10 (or the area of the region 91) becomes substantially the same as the operation time of the second fuel cell 11 (or the area of the region 92). As a result, the degrees of degradation of the first fuel cell 10 and the second fuel cell 11 can be made substantially the same in accordance with the operation pattern of the vehicle (such as a case where the vehicle is driven mostly in urban areas, or a case where the vehicle is driven mostly on expressways). Thus, durability of the fuel cell system 400 can be further improved. Where the operation time of the first fuel cell 10 is substantially the same as the operation time of the second fuel cell 11, the area of the region 92 representing the operation time of the second fuel cell 11 may be equal to or larger than 80% and be equal to or smaller than 120% of the area of the region 91 representing the operation time of the first fuel cell 10, or may be equal to or larger than 90% and be equal to or smaller than 110% of the area of the region 91. Note that the operation history is not necessarily a map showing the relationship between the requested power and the operation time. The operation history may be a map showing the relationship between the requested power and the total power generation amount, or a map showing the requested power and the number of times the requested power is exceeded, or a combination of these maps.

The communication unit 26 exchanges data with an external server 90. For example, the communication unit 26 transmits an operation history (such as a map showing the correlation between requested power and operation time as illustrated in FIG. 15, for example) to the external server 90. The communication unit 26 also receives, from the external server 90, an operation history (such as a map showing the correlation between requested power and operation time as illustrated in FIG. 15, for example) that has been transmitted from another vehicle and been stored in the external server 90.

On the basis of an operation history of the fuel cell system of another vehicle received from the external server 90, the control unit 20 may change the first threshold and the third threshold so that the first fuel cell 10 and the second fuel cell 11 have substantially the same degree of degradation. For example, on a basis of an operation history received from the external server 90 and formed with a map showing the correlation between requested power and operation time as illustrated in FIG. 15, the first threshold and/or the third threshold may be changed so that the operation time of the first fuel cell 10 and the operation time of the second fuel cell 11 become substantially the same. As a result, even when the fuel cell system 400 has been operated only for a short time, the degree of degradation of the first fuel cell 10 and the degree of degradation of the second fuel cell 11 can be made substantially the same, and durability of the fuel cell system 400 can be improved. When there are areas set for respective cities, for example, the control unit 20 may acquire an operation history from the external server 90 located in the area corresponding to the current position of the vehicle equipped with the fuel cell system 400 or the position in which the vehicle is normally stored.

In the example cases described in the first through fourth embodiments, two fuel cells are included in a fuel cell system. However, three or more fuel cells may be included in a fuel cell system. In that case, two of the three or more fuel cells are equivalent to the first fuel cell 10 and the second fuel cell 11 described in the first through fourth embodiments.

Although some embodiments of the present disclosure have been described in detail, the present disclosure is not limited to the specific embodiments but may be varied or changed within the scope of the present disclosure as claimed. Although some embodiments of the present disclosure have been described in detail, the present disclosure is not limited to the specific embodiments but may be varied or changed within the scope of the present disclosure as claimed.

What is claimed is:

1. A fuel cell system comprising:
a first fuel cell;
a second fuel cell having a maximum power output that is greater than a maximum power output of the first fuel cell; and
a power generation controller configured to control power generation from the first fuel cell and the second fuel cell in accordance with requested power,
wherein,
when the requested power is smaller than a first threshold, the power generation controller is configured to cause the first fuel cell to generate electric power greater than electric power generated by the second fuel cell so that the requested power is supplied,
when the requested power is equal to or greater than a second threshold and smaller than a third threshold, the power generation controller is configured to cause the second fuel cell to generate electric power greater than electric power generated by the first fuel cell so that the requested power is supplied, the second threshold being equal to or greater than the first threshold, the third threshold being greater than the second threshold, and the third threshold also being equal to or greater than 70% of the maximum power output of the second fuel cell and equal to or smaller than 100% of the maximum power output of the second fuel cell, and
when the requested power is equal to or greater than the third threshold, the power generation controller is configured to cause both the first fuel cell and the second fuel cell to generate electric power so that the requested power is supplied.

2. The fuel cell system according to claim 1, wherein the power generation controller is configured to suspend power generation from the second fuel cell when the requested power is smaller than the first threshold, and/or is configured to suspend power generation from the first fuel cell when the requested power is equal to or greater than the second threshold and is smaller than the third threshold.

3. The fuel cell system according to claim 1, wherein the power generation controller is configured to cause the second fuel cell to generate electric power at a voltage at which elution of a catalyst contained in the second fuel cell is inhibited when the requested power is smaller than the first threshold, and/or is configured to cause the first fuel cell to generate electric power at a voltage at which elution of a catalyst contained in the first fuel cell is inhibited when the requested power is equal to or greater than the second threshold and is smaller than the third threshold.

4. The fuel cell system according to claim 1, wherein
the second threshold has a greater value than the first threshold, and,
when the requested power is equal to or greater than the first threshold and is smaller than the second threshold, the power generation controller is configured to cause the first fuel cell and the second fuel cell to generate electric power so that the requested power is provided by both the first fuel cell and the second fuel cell.

5. The fuel cell system according to claim 4, wherein, when the requested power is equal to or greater than the first threshold and is smaller than the second threshold, the power generation controller is configured to cause output power of the first fuel cell to become smaller and is configured to cause output power of the second fuel cell to become larger in response to an increase in the requested power.

6. The fuel cell system according to claim 1, wherein the second threshold has the same value as the first threshold.

7. The fuel cell system according to claim 1, wherein the first threshold is equal to or greater than 70% of the maximum power output of the first fuel cell and is equal to or smaller than 100% of the maximum power output of the first fuel cell.

8. The fuel cell system according to claim 1, wherein when a rate of change in the requested power is equal to or higher than a predetermined value, the power generation controller is configured to reduce at least one of the first threshold and the third threshold to a smaller value than in a case where the rate of change in the requested power is lower than the predetermined value.

9. The fuel cell system according to claim 1, further comprising
a storage unit that is configured to store a map showing a correlation between requested power and an operation time of each of the first fuel cell and the second fuel cell,
wherein, on the basis of the map stored in the storage unit, the power generation controller is configured to change at least one of the first threshold and the third threshold so that the operation time of the second fuel cell becomes equal to or greater than 80% of the operation time of the first fuel cell and equal to or less than 120% of the operation time of the first fuel cell.

10. The fuel cell system according to claim 1, wherein, on the basis of a map received from an external server and showing a correlation between requested power and an operation time in another fuel cell system, the power generation controller is configured to change at least one of the first threshold and the third threshold so that an operation time of the second fuel cell becomes equal to or greater than 80% of an operation time of the first fuel cell and equal to or less than 120% of the operation time of the first fuel cell.

* * * * *